(12) United States Patent
Wu

(10) Patent No.: US 12,219,640 B2
(45) Date of Patent: Feb. 4, 2025

(54) MANAGING SIDELINK AND NON-SIDELINK INFORMATION

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

(*) Notice: Subject to any disclaimer, the term of this patent is extended or adjusted under 35 U.S.C. 154(b) by 310 days.

(21) Appl. No.: 17/642,895

(22) PCT Filed: Jul. 1, 2021

(86) PCT No.: PCT/US2021/040047
§ 371 (c)(1),
(2) Date: Mar. 14, 2022

(87) PCT Pub. No.: WO2022/031390
PCT Pub. Date: Feb. 10, 2022

(65) Prior Publication Data
US 2022/0361273 A1    Nov. 10, 2022

Related U.S. Application Data

(60) Provisional application No. 63/062,073, filed on Aug. 6, 2020.

(51) Int. Cl.
*H04W 76/16* (2018.01)
*H04W 24/10* (2009.01)
*H04W 76/14* (2018.01)

(52) U.S. Cl.
CPC ........... *H04W 76/16* (2018.02); *H04W 24/10* (2013.01); *H04W 76/14* (2018.02)

(58) Field of Classification Search
CPC ...... H04W 76/16; H04W 76/14; H04W 24/10
See application file for complete search history.

(56) References Cited

U.S. PATENT DOCUMENTS

2018/0139682 A1   5/2018  Xu et al.
2018/0227973 A1   8/2018  Tsuboi et al.
(Continued)

FOREIGN PATENT DOCUMENTS

CN    110636640 A    12/2019
EP    3 416 436 A1   12/2018
(Continued)

OTHER PUBLICATIONS

David Garcia-Roger et al., 'Regional Multi-RAT Dual Connectivity Management for Reliable 5G V2X Communications', 2022 Joint European Conference on Networks and Communications & 6G Summit (EuCNC/6G Summit): Vertical Applications and Internet of Things (VAP), pp. 1-6. (Year: 2022).*

(Continued)

*Primary Examiner* — Melvin C Marcelo
(74) *Attorney, Agent, or Firm* — MARSHALL, GERSTEIN & BORUN LLP

(57) ABSTRACT

To manage sidelink and non-sidelink information, a user device obtains, by processing hardware in a user device communicating with a radio access network (RAN), a first set of information for sidelink communication with another user device (504A), and obtains, by the processing hardware, a second set of information for non-sidelink communication (504B). The user device transmits, by the processing hardware to the RAN, a first message including the first set of information (1010A), and transmits, by the processing hardware to the RAN, a second message including the second set of information (1010B), the first and second messages being separate messages.

19 Claims, 14 Drawing Sheets

(56) References Cited

U.S. PATENT DOCUMENTS

| | | |
|---|---|---|
| 2019/0373670 A1 | 12/2019 | Panchal |
| 2019/0387569 A1 | 12/2019 | Martinez Tarradell et al. |
| 2020/0107236 A1 | 4/2020 | Tseng et al. |
| 2020/0170059 A1 | 5/2020 | Belleschi et al. |
| 2024/0155582 A1* | 5/2024 | Ye .................... H04L 5/0055 |

FOREIGN PATENT DOCUMENTS

| | | |
|---|---|---|
| WO | WO-2018/231748 A1 | 12/2018 |
| WO | WO-2020/009431 A1 | 1/2020 |
| WO | WO-2020/056680 A1 | 3/2020 |

OTHER PUBLICATIONS

International Search Report and Written Opinion for Application No. PCT/US2021/040047, dated Oct. 8, 2021.
First Examination Report for India Application No. 202247018799, dated Jul. 6, 2023.
Office Action for Australian Patent Application No. 2021320075, dated Jan. 9, 2023.

* cited by examiner

MANAGING SIDELINK AND NON-SIDELINK INFORMATION

CROSS-REFERENCE TO RELATED APPLICATIONS

This application claims priority to and the benefit of the filing date of U.S. Provisional Patent Application No. 63/062,073 entitled "Managing Sidelink and Non-Sidelink Information," filed on Aug. 6, 2020, the entire disclosure of which is hereby expressly incorporated by reference.

FIELD OF THE DISCLOSURE

This disclosure relates generally to wireless communications and, more particularly, to sidelink and non-sidelink communication operations.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides services for signaling radio bearers (SRBs) to the Radio Resource Control (RRC) sublayer. The PDCP sublayer also provides services for data radio bearers (DRBs) to a Service Data Adaptation Protocol (SDAP) sublayer or a protocol layer such as an Internet Protocol (IP) layer, an Ethernet protocol layer, and an Internet Control Message Protocol (ICMP) layer. Generally speaking, the UE and a base station can use SRBs to exchange RRC messages as well as non-access stratum (NAS) messages, and can use DRBs to transport data on a user plane.

UEs can use several types of SRBs and DRBs. When operating in dual connectivity (DC), the cells associated with the base station operating as the master node (MN) define a master cell group (MCG), and the cells associated with the base station operating as the secondary node (SN) define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs terminated at the MN and using the lower-layer resources of only the MN can be referred as MCG DRBs, DRBs terminated at the SN and using the lower-layer resources of only the SN can be referred as SCG DRBs, and DRBs terminated at the MCG but using the lower-layer resources of the MN, the SN, or both the MN and the SN can be referred to as split DRBs.

The UE in some scenarios can concurrently utilize resources of multiple nodes (e.g., base stations or components of a distributed base station) of a radio access network (RAN), interconnected by a backhaul. When these network nodes support different radio access technologies (RATs), this type of connectivity is referred to as Multi-Radio Dual Connectivity (MR-DC). When a UE operates in MR-DC, one base station operates as the MN that covers a primary cell (PCell), and the other base station operates as the SN that covers a primary secondary cell (PSCell). The UE communicates with the MN (via the PCell) and the SN (via the PSCell). In other scenarios, the UE utilizes resources of one base station at a time. One base station and/or the UE determines that the UE should establish a radio connection with another base station. For example, one base station can determine to hand the UE over to the second base station, and initiate a handover procedure. The UE in other scenarios can concurrently utilize resources of a RAN node (e.g., a single base station or a component of a distributed base station), interconnected by a backhaul.

A UE in RRC_CONNECTED state communicates in single connectivity with a base station of a radio access network (RAN). Alternatively, the UE in the RRC_CONNECTED state communicates in dual connectivity with a master base station and a secondary base station of the RAN.

When the UE determines to send a measurement report for sidelink communication, the UE includes first measurement results related to sidelink communication in a measurement report. According to 3GPP TS 38.331 or 36.331 v16.1.0, the UE also includes second measurement results related to downlink or uplink (DL/UL) communication in the measurement report. Then the UE transmits the measurement report to the RAN. When the first and second measurement results are included in the measurement report, the UE clears, deletes, or releases the first and second measurement results so that the UE does not send duplicate or stale measurement results to the RAN. However, the UE evaluates measurement results related to sidelink differently than measurement results related to DL/UL communication. Namely, the UE evaluates measurement results related to DL/UL communication against one or more thresholds configured by the RAN. Clearance of the measurement results related to DL/UL communication may cause the evaluation to restart, which may cause the UE to take more time to report a measurement event to the RAN.

The UE in (NG)EN-DC with MeNB and SgNB may transmit a MeasurementReport message for sidelink communication to the SgNB according to 3GPP TS 38.331 v16.1.0 (2020-07) section 5.5.5.1. Given that the SgNB does not expect to receive a MeasurementReport message for sidelink communication on SRB3 from the UE, the SgNB may determine a protocol error due to receiving the invalid MeasurementReport message. In response to the protocol error, the SgNB may initiate an SN Release procedure with the MeNB to disconnect from the UE. As a result of the SN Release procedure, the MeNB sends to the UE an RRCConnectionReconfiguration message releasing the (NG)EN-DC. The UE transitions to single connectivity in response to the RRCConnectionReconfiguration message, so that the UE cannot benefit from a higher data rate provided by the SgNB in dual connectivity.

In some scenarios, in compliance with 3GPP TS 38.331 v16.1.0 (2020-07) section 5.7.4.3, the UE in (NG)EN-DC with MeNB and SgNB may transmit a UEAssistanceInformation message for sidelink communication via SRB3 to the SgNB, and also may transmit the MeasurementReport message to the SgNB. Given that the SgNB does not expect to receive a UEAssistanceInformation message for sidelink communication on SRB3 from the UE, the SgNB may generate a protocol error due to receiving the invalid UEAssistanceInformation message. In response to the protocol error, the SgNB may initiate an SN Release procedure with the MeNB to disconnect from the UE. As a result of the SN Release procedure, the MeNB sends to the UE an RRCConnectionReconfiguration message releasing the (NG)EN-DC. Accordingly, the UE transitions to single connectivity in response to the RRCConnectionReconfiguration message, and the UE does not benefit from a higher data rate provided by the SgNB in dual connectivity.

SUMMARY

An example embodiment of these techniques is a method in a user device for managing sidelink and non-sidelink information. The method can be executed by processing hardware and includes obtaining, by processing hardware in a user device communicating with a radio access network (RAN), a first set of information for sidelink communication with another user device, and obtaining, by the processing hardware, a second set of information for non-sidelink communication. The method further includes transmitting, by the processing hardware to the RAN, a first message including the first set of information, and transmitting, by the processing hardware to the RAN, a second message including the second set of information, the first and second messages being separate messages.

Yet another example embodiment of these techniques is a user device including processing hardware and configured to execute the method above.

Still another example embodiment of these techniques is a method in a base station for managing sidelink and non-sidelink information. The method can be executed by processing hardware and includes receiving, by processing hardware in a base station communicating with a user device, a first instance of a message having a message format and a first payload having a first payload type, and receiving, by the processing hardware, a second instance of the message having a same message format as the first instance of the message and a second payload having a second payload type. In response to determining that the first payload and the second payload have a different payload type, the method includes retaining, by the processing hardware, the first instance of the message Another example embodiment of these techniques is a base station including processing hardware and configured to implement the method above.

DETAILED DESCRIPTION OF THE DRAWINGS

Figure 1A:
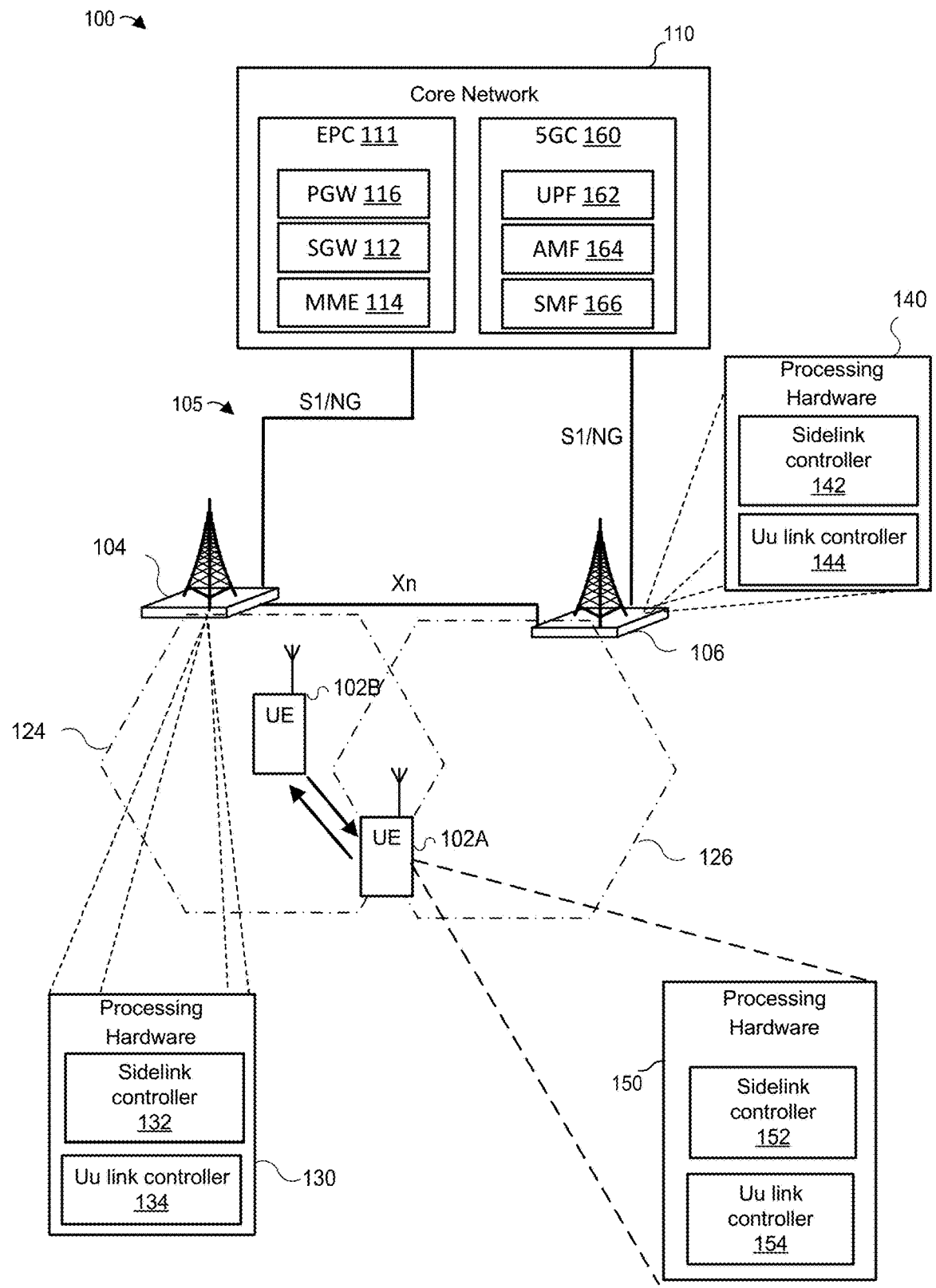
FIG. 1A is a block diagram of an example system in which a RAN and a UE can implement the techniques of this disclosure for managing sidelink assistance information reporting.

FIG. 1A depicts an example wireless communication system 100 that can implement DAPS operation techniques of this disclosure. The wireless communication system 100 includes UEs 102A, 102B, as well as base stations 104, 106 that are connected to a core network (CN) 110. The base stations 104, 106 can be any suitable type, or types, of base stations, such as an evolved node B (eNB), a next-generation eNB (ng-eNB), or a 5G Node B (gNB), for example. As a more specific example, the base station 104 can be an eNB or a gNB, and the base station 106 can be a gNB. To simplify description below, the UE 102 can represent the either the UE 102A or the UE 102B, or both the UE 102A and the UE 102B, unless specified otherwise.

The base station 104 supports a cell 124, and the base station 106 supports a cell 126. The cell 124 partially overlaps with both of cells 126, such that the UE 102 can be in range to communicate with base station 104 while simultaneously being in range to communicate with base station 106 (or in range to detect or measure the signal from base stations 106, etc.). The overlap can make it possible for the UE 102A to hand over between cells (e.g., from cell 124 to cell 126) or base stations (e.g., from base station 104 to base station 106) before the UE 102 experiences radio link failure, for example. Moreover, the overlap allows the various dual connectivity (DC) scenarios discussed below.

More particularly, when the UE 102 is in DC with the base station 104 and the base station 106, the base station 104 operates as a master eNB (MeNB), a master ng-eNB (Mng-eNB), or a master gNB (MgNB), and the base station 106 operates as a secondary gNB (SgNB) or a secondary ng-eNB (Sng-eNB). In implementations and scenarios where the UE 102 is in SC with the base station 104 but is capable of operating in DC, the base station 104 operates as an MeNB, an Mng-eNB or an MgNB, and the base station 106 operates as a candidate SgNB (C-SgNB) or a candidate Sng-eNB (C-Sng-eNB). Although various scenarios are described below in which the base station 104 operates as an MN and the base station 106 operates as an SN, any of the base stations 104, 106 generally can operate as an MN or an SN in different scenarios. Thus, in some implementations, the base station 104 and the base station 106 can implement similar sets of functions and each support MN and SN operations.

In operation, the UE 102 can use a radio bearer (e.g., a DRB or an SRB) that at different times terminates at an MN (e.g., the base station104) or an SN (e.g., the base station 106). For example, after handover to the base station 106, the UE 102 can use a radio bearer (e.g., a DRB or an SRB) that at different times terminates at the base station 106. The UE 102 can apply one or more security keys when communicating on the radio bearer, in the uplink (from the UE 102 to a base station) and/or downlink (from a base station to the UE 102) direction.

In some scenarios, the UE 102A in RRC_IDLE, RRC_INACTIVE or RRC_CONNECTED state may perform a sidelink communication (e.g., for V2X or a proximity service) with the UE 102B. The sidelink communication can be NR or LTE sidelink communication and/or V2X sidelink communication. While the UE 102 is inside the RAN 105 coverage, the RAN 105 can configure and control the sidelink communication via dedicated signaling (e.g., RRC reconfiguration message) or broadcast system information (e.g., system information block(s)). While the UE 102 in RRC_CONNECTED, the UE 102 can send a SidelinkUEInformation message to the RAN 105 in order to request or release sidelink resources for the sidelink communication and/or report QoS information for each destination in the sidelink communication. For example, the RAN 105 provides a RRC reconfiguration message to the UE 102 in order to provide the UE with a dedicated sidelink configuration after the RAN 105 receives the SidelinkUEInformation message. The RRC reconfiguration may include an SLRB configuration for NR sidelink communication as well as either a sidelink scheduling configuration or a resource pool configuration. If UE 102 has received a sidelink radio bearer (SLRB) configuration via system information, the UE 102 should continue using the configuration to perform sidelink data transmissions and receptions until a new configuration is received via an RRC reconfiguration message that the RAN 105 transmits to the UE 102. During handover, the UE 102 performs sidelink communication (e.g., transmission and/or reception) based on configuration of the exceptional transmission resource pool or configured sidelink grant Type 1 and/or reception resource pool of a target cell as provided in a handover command message. The RAN 105 may also configure measurement and reporting of channel busy ratio (CBR) and/or reporting of location information to the UE via an RRC reconfiguration message that the RAN 105 transmits to the UE 102. The RAN 105 may also configure the UE 102 to provide configured grant assistance information for the sidelink communication via an RRC reconfiguration message that the RAN 105 transmits to the UE 102.

The base station 104 includes processing hardware 130, which can include one or more general-purpose processors (e.g., central processing units (CPUs) and a computer-readable memory storing machine-readable instructions executable on the one or more general-purpose processor(s), and/or special-purpose processing units. The processing hardware 130 in the example implementation in FIG. 1A includes a base station sidelink controller 132 that is configured to manage or control sidelink configurations and procedures. For example, the base station sidelink controller 132 can be configured to support RRC messaging associated with sidelink configuration and procedures. The processing hardware 130 includes a base station Uu link controller 134 that is configured to manage or control a Uu link (i.e., a link between the UE 102 and the base station 104). For example, the base station Uu link controller 134 can be configured to support RRC messaging associated with RRC procedures for managing or controlling radio resources for the UE 102 to communicate with the base station 104, and/or to support the necessary operations when the base station 104 operates as an MN, as discussed below.

The base station 106 includes processing hardware 140, which can include one or more general-purpose processors (e.g., CPUs) and a computer-readable memory storing machine-readable instructions executable on the general-purpose processor(s), and/or special-purpose processing units. The processing hardware 140 in the example implementation in FIG. 1A includes a base station sidelink controller 142 that is configured to manage or control sidelink configurations and procedures. For example, the base station sidelink controller 142 can be configured to support RRC messaging associated with sidelink configuration and procedures. The processing hardware 140 includes a base station Uu link controller 144 that is configured to manage or control a Uu link (i.e., a link between the UE 102 and the base station 104). For example, the base station Uu link controller 144 can be configured to support RRC messaging associated with RRC procedures for managing or controlling radio resources for the UE 102 to communicate with the base station 104, and/or to support the necessary operations when the base station 104 operates as an MN or SN, as discussed below.

The UE 102 includes processing hardware 150, which can include one or more general-purpose processors (e.g., CPUs) and a computer-readable memory storing machine-readable instructions executable on the general-purpose processor(s), and/or special-purpose processing units. The processing hardware 150 in the example implementation in FIG. 1A includes a UE sidelink controller 152 that is configured to manage or control sidelink configurations and procedures. For example, the UE sidelink controller 152 can be configured to support RRC messaging associated with sidelink configuration and procedures. The processing hardware 150 includes a UE Uu link controller 154 that is configured to manage or control a Uu link (i.e., a link between the UE 102 and the RAN 105) according to configuration parameters received from the RAN 105. For example, the UE Uu link controller 152 can be configured to support RRC messaging associated with RRC procedures for managing or controlling radio resources in accordance with any of the implementations discussed below.

The CN 110 can be an evolved packet core (EPC) 111 or a fifth-generation core (5GC) 160, both of which are depicted in FIG. 1A. The base station 104 can be an eNB supporting an S1 interface for communicating with the EPC 111, an ng-eNB supporting an NG interface for communicating with the 5GC 160, or as a gNB that supports the NR radio interface as well as an NG interface for communicating with the 5GC 160. The base station 106 can be an EN-DC gNB (en-gNB) with an S1 interface to the EPC 111, an en-gNB that does not connect to the EPC 111, a gNB that supports the NR radio interface and an NG interface to the 5GC 160, or a ng-eNB that supports an EUTRA radio interface and an NG interface to the 5GC 160. To directly exchange messages with each other during the scenarios discussed below, the base stations 104, 106 can support an X2 or Xn interface.

Among other components, the EPC 111 can include a Serving Gateway (SGW) 112, a Mobility Management Entity (MME) 114 and a Packet Data Network (PDN) Gateway (PGW) 116. The SGW 112 and/or PGW 116 is/are generally configured to transfer user-plane packets related to audio calls, video calls, Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. The UPF 162 is generally configured to transfer user-plane packets related to audio calls, video calls, Internet traffic, etc., the AMF 164 is configured to manage authentication, registration, paging, and other related functions, and the SMF 166 is configured to manage PDU sessions.

Generally, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure can also apply to other suitable radio access and/or core network technologies such as sixth generation (6G) radio access and/or 6G core network or 5G NR-6G DC, for example.

In different configurations or scenarios of the wireless communication system 100, the base station 104 can operate as an MeNB, an Mng-eNB, or an MgNB and the base station 106 can operate as an MeNB, an Mng-eNB, an MgNB, an SgNB, or an Sng-eNB. The UE 102 can communicate with the base station 104 and the base station 106 via the same radio access technology (RAT), such as EUTRA or NR, or via different RATs.

When the base station 104 is an MeNB and the base station 106 is an SgNB, the UE 102 can be in EUTRA-NR DC (EN-DC) with the MeNB 104 and the SgNB 106. When the base station 104 is an Mng-eNB and the base station 106 is an SgNB, the UE 102 can be in next generation (NG) EUTRA-NR DC (NGEN-DC) with the Mng-eNB 104 and the SgNB 106. When the base station 104 is an MgNB and the base station 106 is an SgNB, the UE 102 can be in NR-NR DC (NR-DC) with the MgNB 104 and the SgNB 106. When the base station 104 is an MgNB and the base station 106 is an Sng-eNB, the UE 102 can be in NR-EUTRA DC (NE-DC) with the MgNB 104 and the Sng-eNB 106.

Figure 1B:
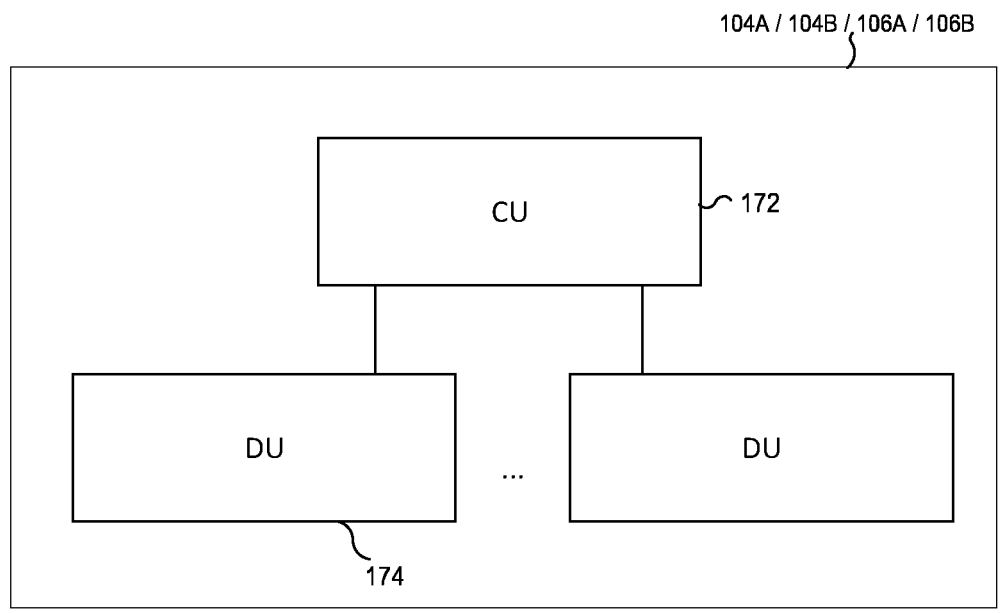
FIG. 1B is a block diagram of an example base station in which a centralized unit (CU) and a distributed unit (DU) can operate in the system of FIG. 1A.

FIG. 1B depicts an example, distributed implementation of any one or more of the base stations 104, 106. In this implementation, the base station 104 or 106 includes a centralized unit (CU) 172 and one or more distributed units (DUs) 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include the processing hardware 130 or 140 of FIG. 1A. The processing hardware can include a base station RRC controller (e.g., RRC controller 142) configured to manage or control one or more RRC configurations and/or RRC procedures when the base station (e.g., base station 106) operates as an SN.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a medium access control (MAC) controller configured to manage or control one or more MAC operations or procedures (e.g., a random access procedure), and a radio link control (RLC) controller configured to manage or control one or more RLC operations or procedures when the base station (e.g., base station 106) operates as an MN or an SN. The process hardware can also include a physical layer controller configured to manage or control one or more physical layer operations or procedures.

Figure 2A:
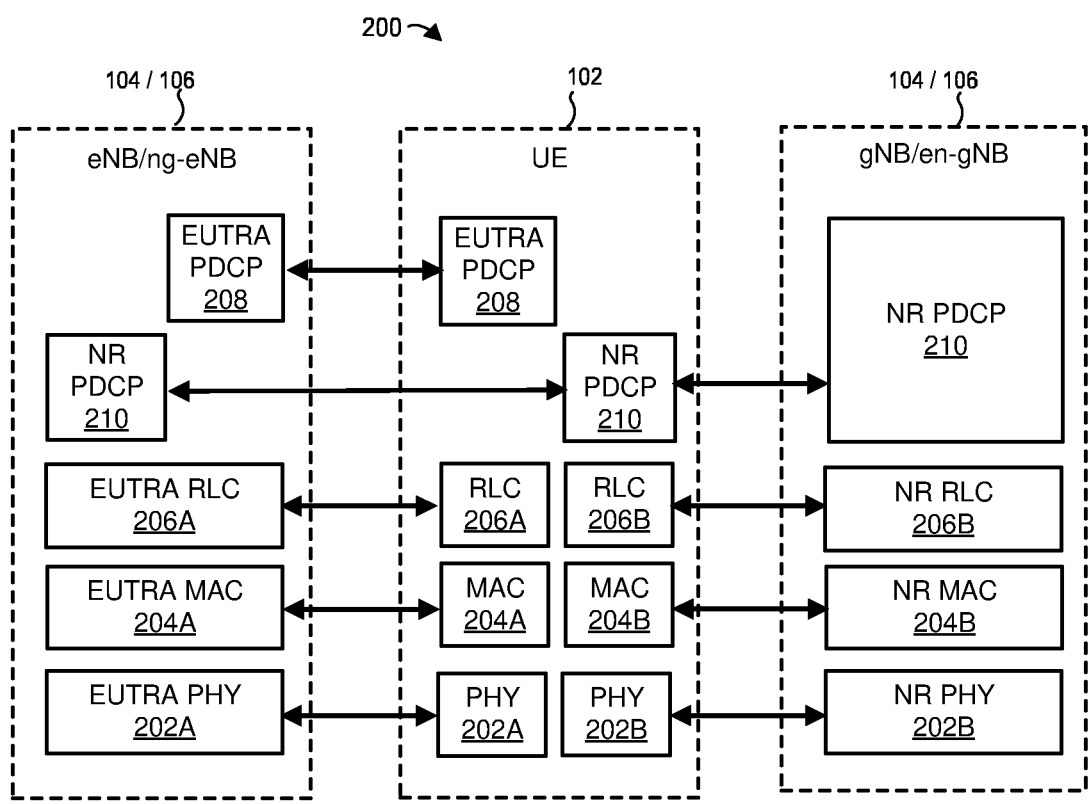
FIG. 2A is a block diagram of an example protocol stack, according to which the UE of FIG. 1A can communicate with base stations of FIG. 1A.

FIG. 2A illustrates, in a simplified manner, an example protocol stack 200 according to which the UE 102 can communicate with an eNB/ng-eNB or a gNB (e.g., one or more of the base stations 104, 106).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to the EUTRA PDCP sublayer 208 and, in some cases, to the NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides RLC channels to the NR PDCP sublayer 210. The UE 102, in some implementations, supports both the EUTRA and the NR stack as shown in FIG. 2A, to support handover between EUTRA and NR base stations and/or to support DC over EUTRA and NR interfaces. Further, as illustrated in FIG. 2A, the UE 102 can support layering of NR PDCP 210 over EUTRA RLC 206A.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide SRBs to exchange RRC messages, for example. On a user plane, the EUTRA PDCP sublayer 208 and the NR PDCP sublayer 210 can provide DRBs to support data exchange.

In scenarios where the UE 102 operates in EUTRA/NR DC (EN-DC), with the base station 104 operating as an MeNB and the base station 106 operating as an SgNB, the wireless communication system 100 can provide the UE 102 with an MN-terminated bearer that uses EUTRA PDCP sublayer 208, or an MN-terminated bearer that uses NR PDCP sublayer 210. The wireless communication system 100 in various scenarios can also provide the UE 102 with an SN-terminated bearer, which uses only the NR PDCP sublayer 210. The MN-terminated bearer can be an MCG bearer or a split bearer. The SN-terminated bearer can be an SCG bearer or a split bearer. The MN-terminated bearer can be an SRB (e.g., SRB1 or SRB2) or a DRB. The SN-terminated bearer can be an SRB or a DRB.

Figure 2B:
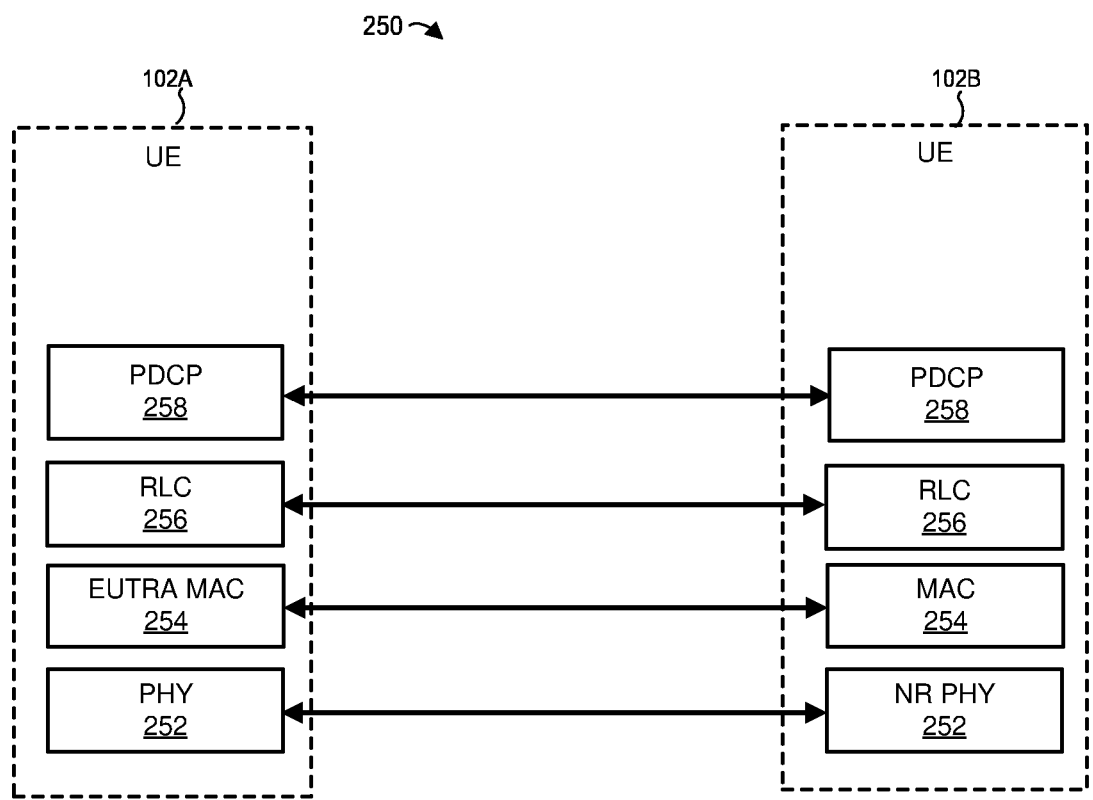
FIG. 2B is a block diagram of an example protocol stack, according to which the UE of FIG. 1A can directly communicate with another UE of FIG. 1A.

FIG. 2B illustrates, in a simplified manner, an example protocol stack 250 for sidelink communication between the UE 102A and the UE 102B.

In the example stack 250, a physical layer (PHY) 252 provides transport channels to the MAC sublayer 254, which in turn provides logical channels to the RLC sublayer 256. The RLC sublayer 256 in turn provides RLC channels to the PDCP sublayer 258. In some implementations, the example stacks 250 can comply to EUTRA or NR.

The PDCP sublayer 258 receive packets (e.g., from an Internet Protocol (IP) layer, layered directly or indirectly over the PDCP layer 258) that can be referred to as service data units (SDUs), and output packets (e.g., to the RLC layer 256) that can be referred to as protocol data units (PDUs). Except where the difference between SDUs and PDUs is relevant, this disclosure for simplicity refers to both SDUs and PDUs as "packets". On a control plane, the PDCP sublayer 258 can provide one or more sidelink SRBs to exchange RRC messages between the UEs 102A and 102B, for example. On a user plane, the PDCP sublayer 258 can provide sidelink one or more DRBs to support data exchange between the UEs 102A and 102B.

Figure 3:
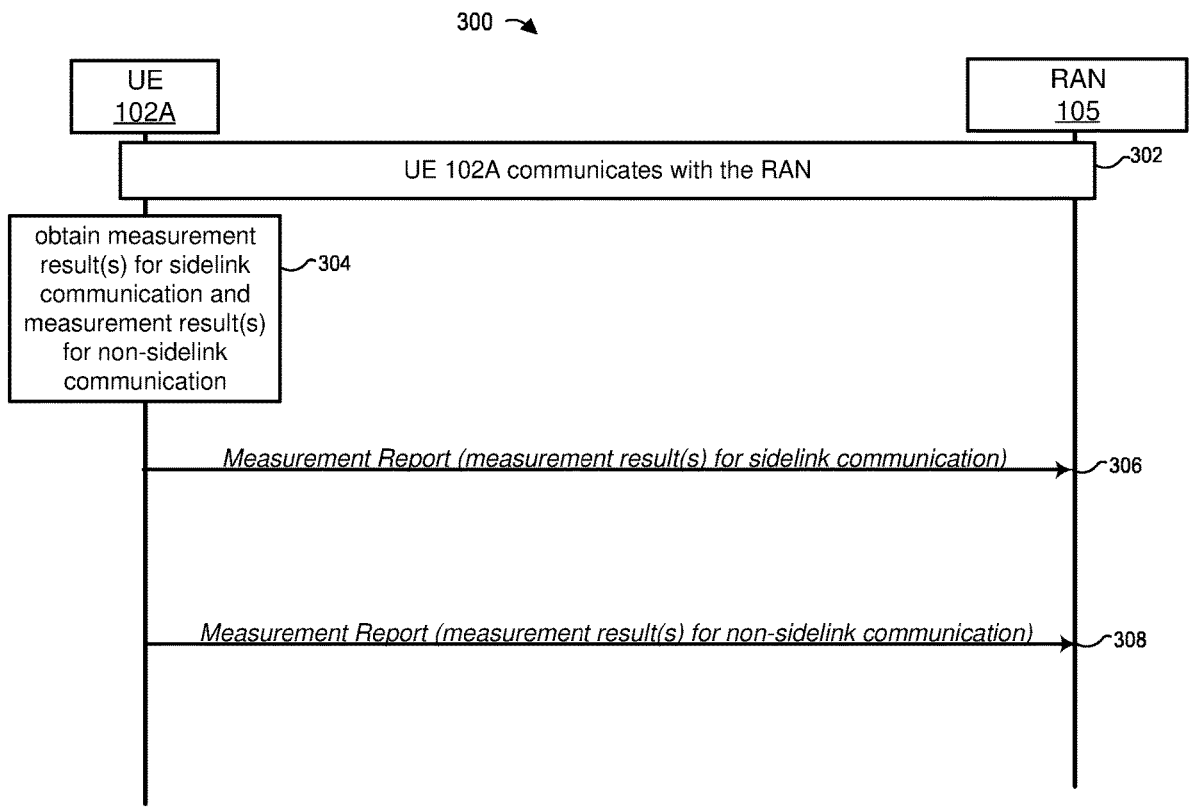
FIG. 3 is a messaging diagram of an example scenario in which a UE transmits separate measurement reports including sidelink information and including non-sidelink information, respectively, to a RAN.

Referring first to FIG. 3, in a scenario 300A, initially, the UE 102 communicates 302 with the RAN 105. In some implementations, the UE 102A communicates 302 data with base station 104 of the RAN 105. In other implementations, base station 104 of the RAN 105 includes a DU and a CU as shown in FIG. 1B. The UE 102A communicates 302 data via the DU with the CU. In yet other implementations, the UE 102 communicates 302 data with base station 104 and base station 106 of the RAN 105, where one of the base stations 104 and 106 can operate as an MN and the other can operate as an SN. In yet other implementations, base station 104 of the RAN 105 includes two DUs and a CU as shown in FIG. 1B, where one of the two DUs can operate as a master DU and the other can operate as a secondary DU. The UE 102 can communicate 302 data with the CU 172 via the two DUs. The data described above can include DL PDUs, UL PDUs, control signals, and/or the messages described below.

While communicating 302 with the RAN 105, the UE 102A obtains 304 first measurement result(s) for sidelink communication and second measurement result(s) for non-sidelink communication (i.e., DL/UL communication). Then the UE 102A transmits 306 a first Measurement Report message including the first measurement result(s) to the RAN 105 (e.g., either the base station 104 or base station 106) and transmits 308 a second Measurement Report message including the second measurement result(s) to the RAN 105 (e.g., either the base station 104 or base station 106).

In some implementations, the UE 102A excludes non-sidelink measurement result(s) (e.g., the second measurement result(s)) from the first Measurement Report message. Thus, the UE 102A continues evaluating non-sidelink measurement reporting by not including the non-sidelink measurement result(s) (e.g., the second measurement result(s)) in the first Measurement Report message.

In other implementations, the UE 102A includes non-sidelink measurement result(s) (e.g., at least a portion of the second measurement result(s)) from the first Measurement Report message. In this case, the UE 102A refrains from clearing the non-sidelink measurement result(s) or raw measurement result(s) used to obtain the non-sidelink measurement result(s). Thus, the UE 102A does not stop evaluating non-sidelink measurement reporting due to including the non-sidelink measurement result(s) in the first Measurement Report message.

In some implementations, the UE 102A excludes sidelink measurement result(s) (e.g., the first measurement result(s)) in the second Measurement Report message. Thus, the UE 102A continues evaluating sidelink measurement reporting by not including the sidelink measurement result(s) in the second Measurement Report message.

In other implementations, the UE 102A includes sidelink measurement result(s) (e.g., at least a portion of the first measurement result(s)) in the second Measurement Report message. In this case, the UE 102A refrains from clearing the sidelink measurement result(s) or raw measurement result(s) used to obtain the sidelink measurement result(s). Thus, the UE 102A does not stop evaluating sidelink measurement reporting due to including the sidelink measurement result(s) in the second Measurement Report message.

In some implementations, the UE 102A performs the sidelink communication with the UE 102B while communicating 302 with the RAN 105. In the sidelink communication, the UE 102A can transmit packets to the UE 102B or receive packets from the UE 102B. To obtain the first measurement result(s), the UE 102A may measure a sidelink carrier frequency where the UE 102A performs sidelink communication with the UE 102B. In some implementations, the UE 102 sends an RRC message (e.g., SidelinkUEInformation) to request or release sidelink resources and/or report QoS information for the sidelink communication. For example, the RRC message can include frequency information indicating the sidelink carrier frequency on which the UE 102A is interested to perform the sidelink communication. The RAN 105 can transmit to the UE 102A a first measurement configuration configuring the UE 102A to measure the sidelink carrier frequency, if or when receiving the RRC message requesting sidelink resources and/or report QoS information for the sidelink communication. The UE 102A measures the sidelink carrier frequency to obtain the first measurement result(s) according to the first measurement configuration.

In some implementations, the RAN 105 can transmit to the UE 102A a second measurement configuration configuring the UE 102 to measure a downlink (DL) carrier frequency. The UE 102A measures the DL carrier frequency to obtain the second measurement result(s) according to the second measurement configuration.

In some implementations, the RAN 105 can transmit at least one RRC message including the first measurement configuration and/or the second measurement configuration to the UE 102A. In response to each of the at least one RRC message, the UE 102A can transmit an RRC response message to the RAN 105. The RRC message and RRC response message can be an RRC reconfiguration (e.g., RRCReconfiguration or RRCConnectionReconfiguration message) and an RRC reconfiguration complete message (e.g., RRCReconfigurationComplete or RRCConnectionReconfigurationComplete message), respectively.

In some implementations, the first or sidelink measurement result(s) may include or indicate one or more sidelink Reference Signal Received Power (RSRP), Reference Signal Received Quality (RSRQ), Received Signal Strength Indicator (RSSI), and/or signal to noise and interference ratio (SINR). In other implementations, the first or sidelink measurement result(s) may include or indicate one or more channel busy ratio (CBR) values. In some implementations, the second or non-sidelink measurement result(s) may include or indicate one or more DL/UL RSRP, RSRQ, RSSI, and/or SINR values.

In some implementations, the UE 102A transmits 306 the Measurement Report message without using an RRC container message including the Measurement Report message. In other implementations, the UE 102A can transmit 306 a ULInformationTransferIRAT message including the Measurement Report message as described for FIG. 4A. In some implementations, the UE 102A can transmit 308 a ULInformationTransferMRDC message including the Measurement Report message as described for FIG. 4A. In other implementations, the UE 102A transmits 308 the Measurement Report message without using an RRC container message including the Measurement Report message, as described for FIG. 4B.

Figure 4A:
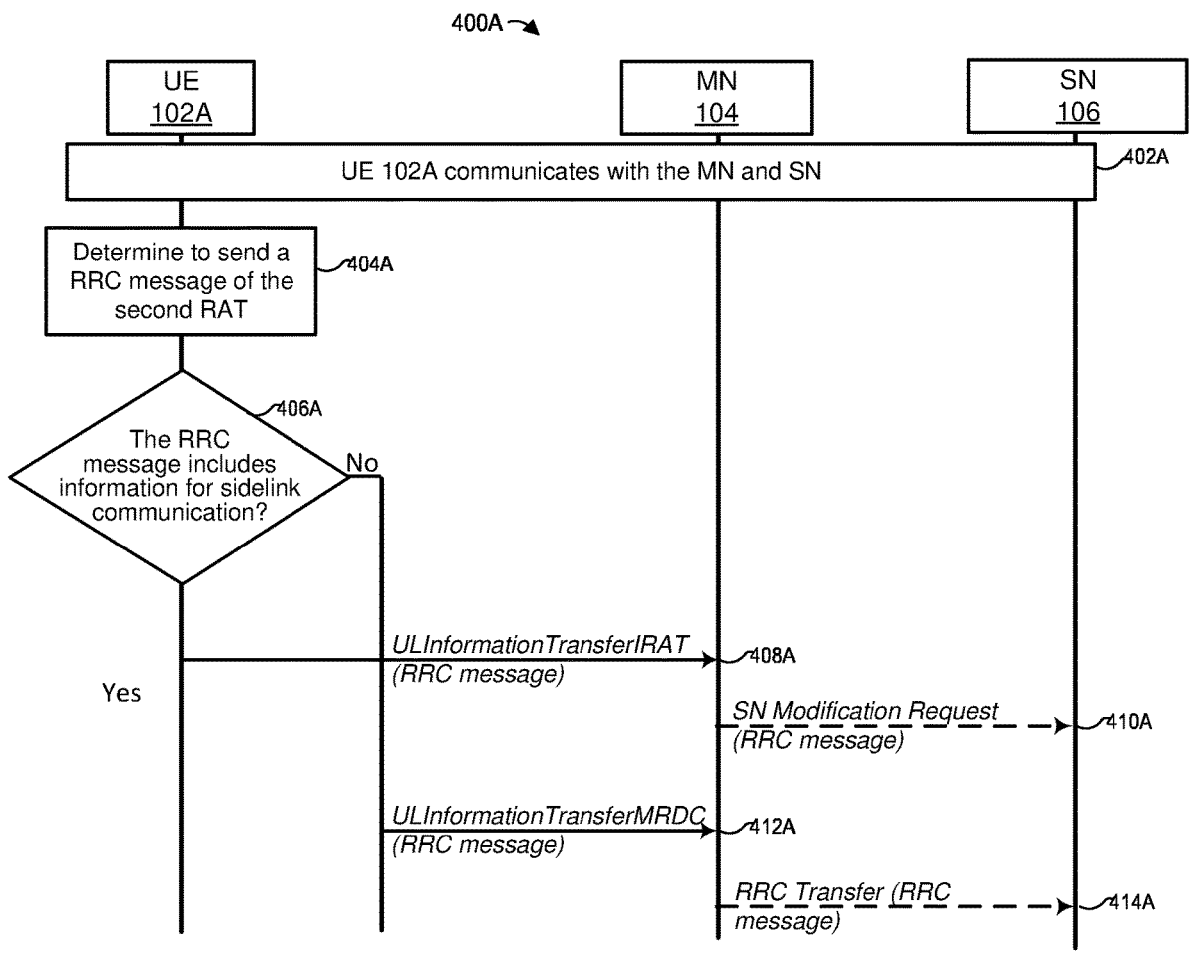
FIG. 4A is a messaging diagram of an example scenario in which a UE in dual connectivity (DC) transmits an RRC message including sidelink information in a first container message to a master node (MN) and transmits an RRC message including non-sidelink information in a second container message to the MN.

Referring next to FIG. 4A, base station 104 in scenario 400A operates as an MN of a first RAT, and the base station 106 operates as an SN of a second RAT. Initially, the UE 102 communicates 402A data with the MN 104 and the SN 106. The data can include DL PDUs, UL PDUs, control signals, and/or the messages described below.

Later in time, the UE 102A determines 404A to send an RRC message of the second RAT. The UE 102A determines 406A whether the RRC message includes information for sidelink communication. If the RRC message includes information for sidelink communication, the UE 102A transmits 408A a ULInformationTransferIRAT message (also referred to herein as a "first container message") including the RRC message to the MN 104 via a first SRB (e.g., SRB1). Then the MN 104 can send 410A an SN Modification Request message including the RRC message to the SN 106. If the RRC message does not include information for sidelink communication, the UE 102A transmits 412A a ULInformationTransferMRDC message (also referred to herein as a "second container message" different from the first container message) including the RRC message to the MN 104 via the first SRB. Then the MN 104 can send 414A an RRC Transfer message including the RRC message to the SN 106. The UE 102A transmits 412A the ULInformationTransferMRDC message including the RRC message to the MN 104 via the first SRB, if a second SRB (e.g., SRB3) between the UE 102A and an SN is not available. The second SRB may not be available because the UE 102A does not support the second SRB, the RAN 105 (i.e., the MN 104 or the SN 106) does not configure the second SRB to the UE 102A, or the UE 102A has suspended the second SRB.

In some implementations, a format of the RRC message has been defined to optionally include first information (e.g., information element(s)) for sidelink communication of the second RAT and include second information (e.g., information element(s)) for non-sidelink communication of the second RAT.

In some implementations, the RRC message is a Measurement Report message, the first information includes measurement result(s) for sidelink communication, and the second information includes measurement result(s) for non-sidelink communication, as described for FIG. 3.

In other implementations, the RRC message is a UEAssistanceInformation message, and the first information includes configured grant assistance information. In such implementations, the second information includes information regarding enabling or disabling power saving, information regarding temporarily reduced capability/capabilities or releasing the temporarily reduced capability/capabilities, overheating assistance information or information indicating the overheating situation is gone, information regarding experiencing an in-device coexistence (IDC) problem or information indicating the IDC problem is gone, and/or information regarding a preferred configuration (e.g., a preferred DRX configuration, a preferred maximum aggregated bandwidth, a preferred maximum number of component carriers (CCs), a preferred maximum number of multiple-input and multiple-output (MIMO) layers, a preferred minimum scheduling offset and/or a preferred RRC state).

In some scenarios and implementations, the UE 102A does not include the second information in the RRC message at event 408A. Alternatively, the UE 102A can include the second information in the RRC message at event 408A if the UE 102 determines to send the second information to the RAN 105 (i.e., the MN 104 or the SN 106 via the MN 104) at event 404A.

In some scenarios and implementations, if the UE 102 has the first and second information available at event 404A, the UE 102A may generate a first instance of the RRC message including the first information and generate a second instance of the RRC message including the second information. Both instances of the RRC message can use the same message format (e.g., Measurement Report message format). Then the UE 102A transmits a ULInformationTransferIRAT message including the first instance of the RRC message similar to event 408A, and transmits a ULInformationTransferMRDC message including the second instance of the RRC message similar to event 412A. When or if the RAN 105 receives the first instance of the RRC message in the ULInformationTransferIRAT message, the RAN 105 can identify and process the first instance of the RRC message for sidelink communication. When or if the RAN 105 receives the second instance of the RRC message in the ULInformationTransferIRAT message, the RAN 105 can identify and process the second instance of the RRC message for non-sidelink communication.

In other scenarios and implementations, if the UE 102A has the first and second information available at event 404A, the UE 102A may include both the first and second information in the RRC message. Then the UE 102A transmits a ULInformationTransferIRAT message including the RRC message similar to event 408A. When or if the RAN 105 receives the RRC message in the ULInformationTransferI-RAT message, the RAN 105 can identify and process the first information for sidelink communication, and identify and process the second information for non-sidelink communication.

In some implementations, the UE 102A may detect different trigger(s) or condition(s) are fulfilled, which causes the UE 102A to have the first and second information available at event 404A.

In some implementations, the first RAT is EUTRA and the second RAT is NR, and the RRC message is a NR RRC message including information for NR sidelink communication. For example, the NR RRC message is a SidelinkUE-InformationNR, UEAssistanceInformation message, or Measurement Report message conforming to 3GPP specification 38.331. In other implementations, the first RAT is NR and the second RAT is EUTRA and the RRC message a EUTRA RRC message including information for EUTRA sidelink communication. For example, the EUTRA RRC message is a SidelinkUEInformation, UEAssistanceInformation message, or Measurement Report message conforming to 3GPP specification 36.331.

In some implementations, the UE 102A performs the sidelink communication with the UE 102B while communicating 402 with the MN 104 and SN 106 as described for FIG. 3. The UE 102A can send the RRC message at event 408A or 412A while performing the sidelink communication. In this manner, the present implementations support maintenance of (NG)EN-DC while the UE 102A also is in sidelink communication. In other implementations, the UE 102A may not perform sidelink communication while communicating 402A with the MN and SN. The UE 102A can send the RRC message at event 408A or 412A while not performing the sidelink communication.

Figure 4B:
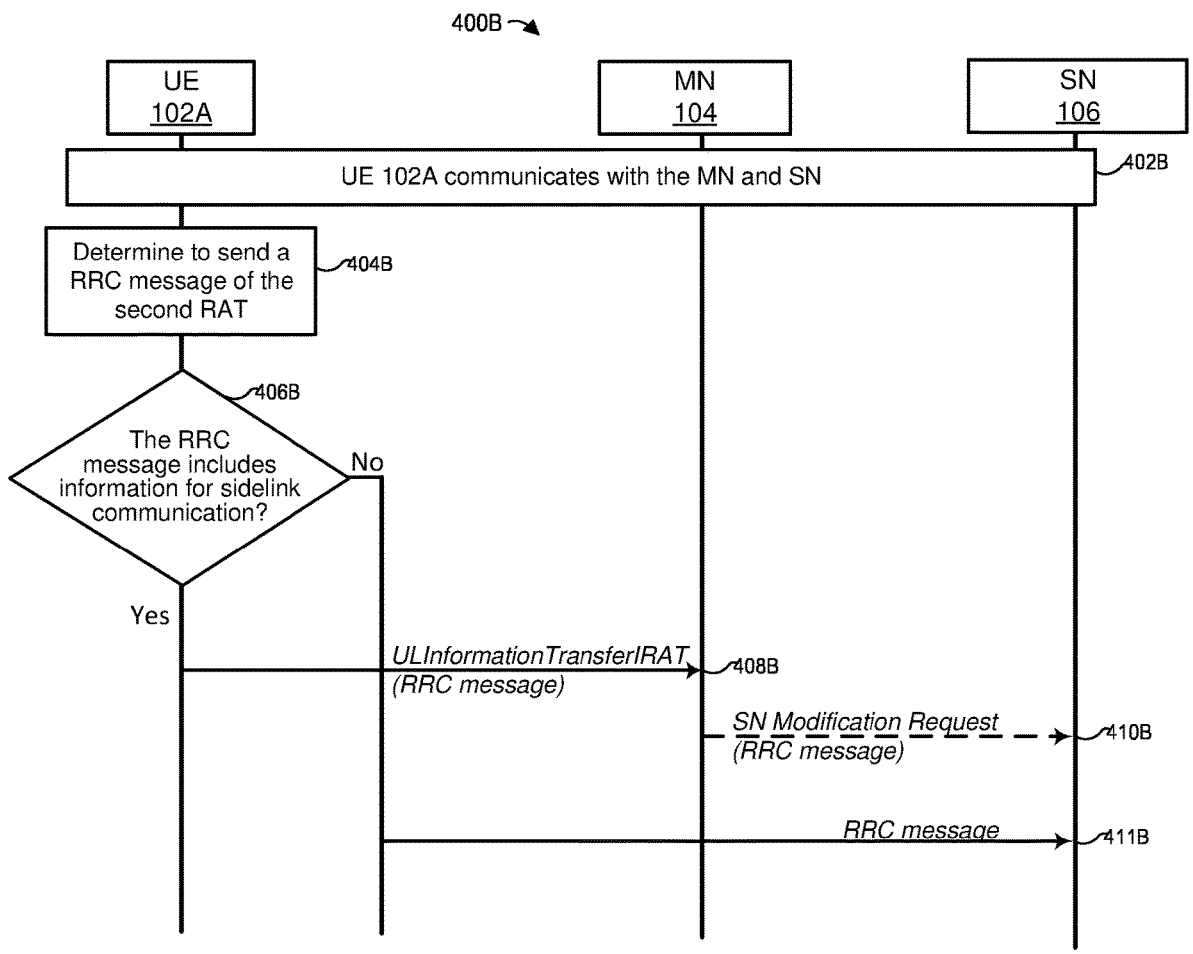
FIG. 4B is a messaging diagram of another example scenario in which a UE in dual connectivity (DC) transmits an RRC message including sidelink information to an MN and transmits an RRC message including non-sidelink information to a secondary node (SN)

FIG. 4B illustrates a scenario 400B similar to the scenario 400A of FIG. 4A. Events in the scenario 400B similar to those discussed above with respect to the scenario 400A are labeled with similar reference numbers (e.g., with event 402A of FIG. 4A corresponding to event 402B of FIG. 4B). With the exception of the differences shown in FIG. 4B and the differences described below, any of the alternative implementations discussed above with respect to the scenario 400A (e.g., for messaging and processing) may apply to the scenario 400B.

If the RRC message does not include information for sidelink communication and the second SRB is available, the UE 102A transmits 411B the RRC message to the SN 106, e.g., via the second SRB (e.g., SRB3). In this case, the UE 102A transmits the RRC message to the SN without using an RRC container message to include the RRC message.

Figure 5A:
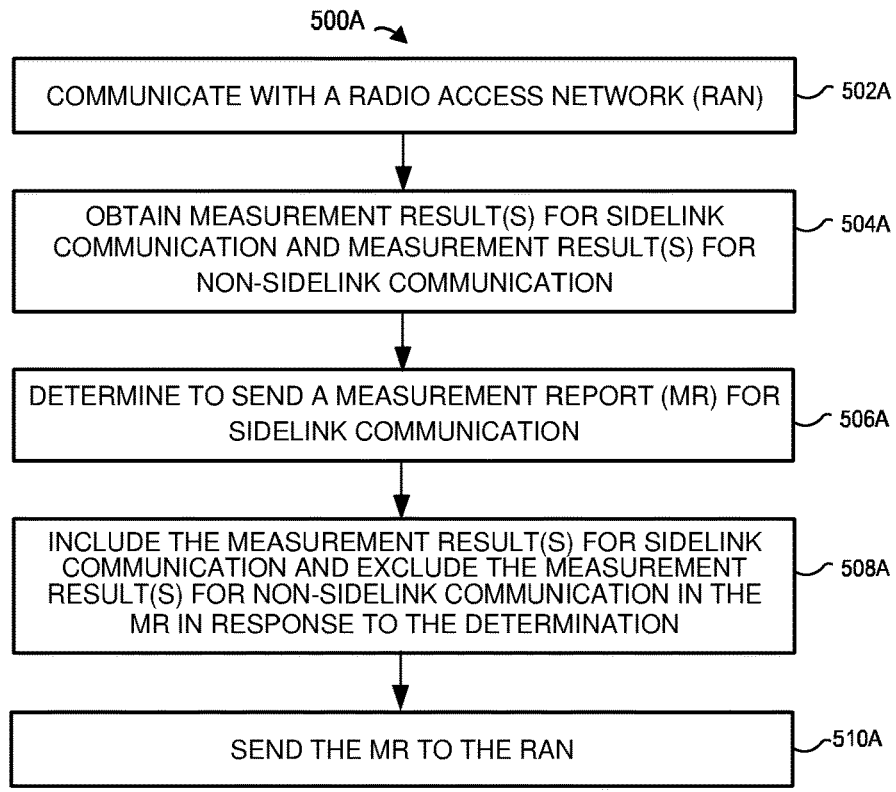
FIG. 5A is a flow diagram of an example method for obtaining and transmitting measurement results which include sidelink and non-sidelink information to a RAN, which can be implemented in the UE of this disclosure.

FIG. 5A is a flow diagram depicting a method 500A for transmitting a Measurement Report message, which may be implemented by a UE (e.g., the UE 102) of this disclosure. Initially, at block 502A, the UE (e.g., in SC or DC) communicates with a radio access network (RAN) (e.g., RAN 105) (e.g., in events 302, 402A, 402B).

At block 504A, the UE obtains measurement result(s) for sidelink communication and measurement result(s) for non-sidelink communication (e.g., in event 304). At block 506A, the UE determines to send a Measurement Report message for sidelink communication. At block 508A, the UE includes the measurement result(s) for sidelink communication and excludes (i.e., refrains from including or does not include) the measurement result(s) for non-sidelink communication in the Measurement Report message in response to the determination (e.g., in events 306, 408A, 408B). At block 510A, the UE sends the Measurement Report message to the RAN (e.g., in events 306, 408A, 408B).

Figure 5B:
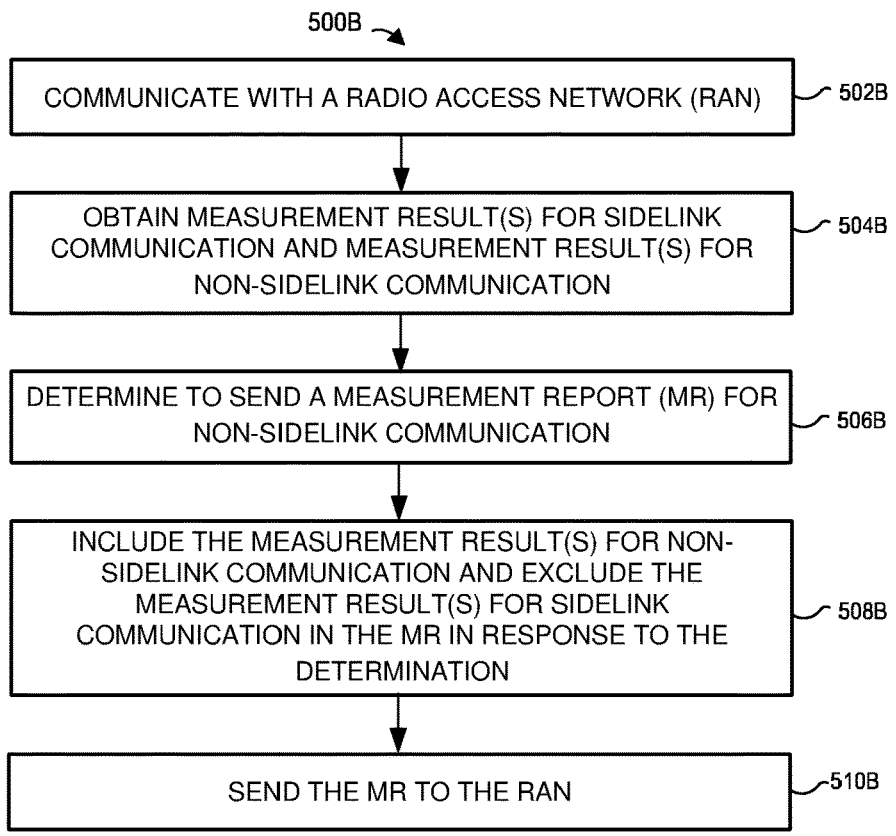
FIG. 5B is a flow diagram of another example method for obtaining and transmitting measurement results which include sidelink and non-sidelink information to a RAN, which can be implemented in the UE of this disclosure.

FIG. 5B is a flow diagram depicting a method 500B for transmitting a Measurement Report message, which may be implemented by a UE (e.g., the UE 102) of this disclosure. Initially, at block 502A, the UE (e.g., in SC or DC) communicates with a radio access network (RAN) (e.g., RAN 105) (e.g., in events 302, 402A, 402B).

At block 504B, the UE obtains measurement result(s) for sidelink communication and measurement result(s) for non-sidelink communication (e.g., in event 304). At block 506B, the UE determines to send a Measurement Report message for non-sidelink communication. At block 508B, the UE includes the measurement result(s) for non-sidelink communication and excludes (i.e., refrains from including or does not include) the measurement result(s) for sidelink communication in the Measurement Report message in response to the determination (e.g., in events 308, 412A, 411B). At block 510B, the UE sends the Measurement Report message to the RAN (e.g., in events 308, 412A, 411B).

The Measurement Report for sidelink communication as described in the method 500A may be a first measurement report, and the Measurement Report for non-sidelink communication as described in the method 500B may be a second measurement report. The UE may send the first and second measurement reports as separate messages to the RAN.

Figure 6:
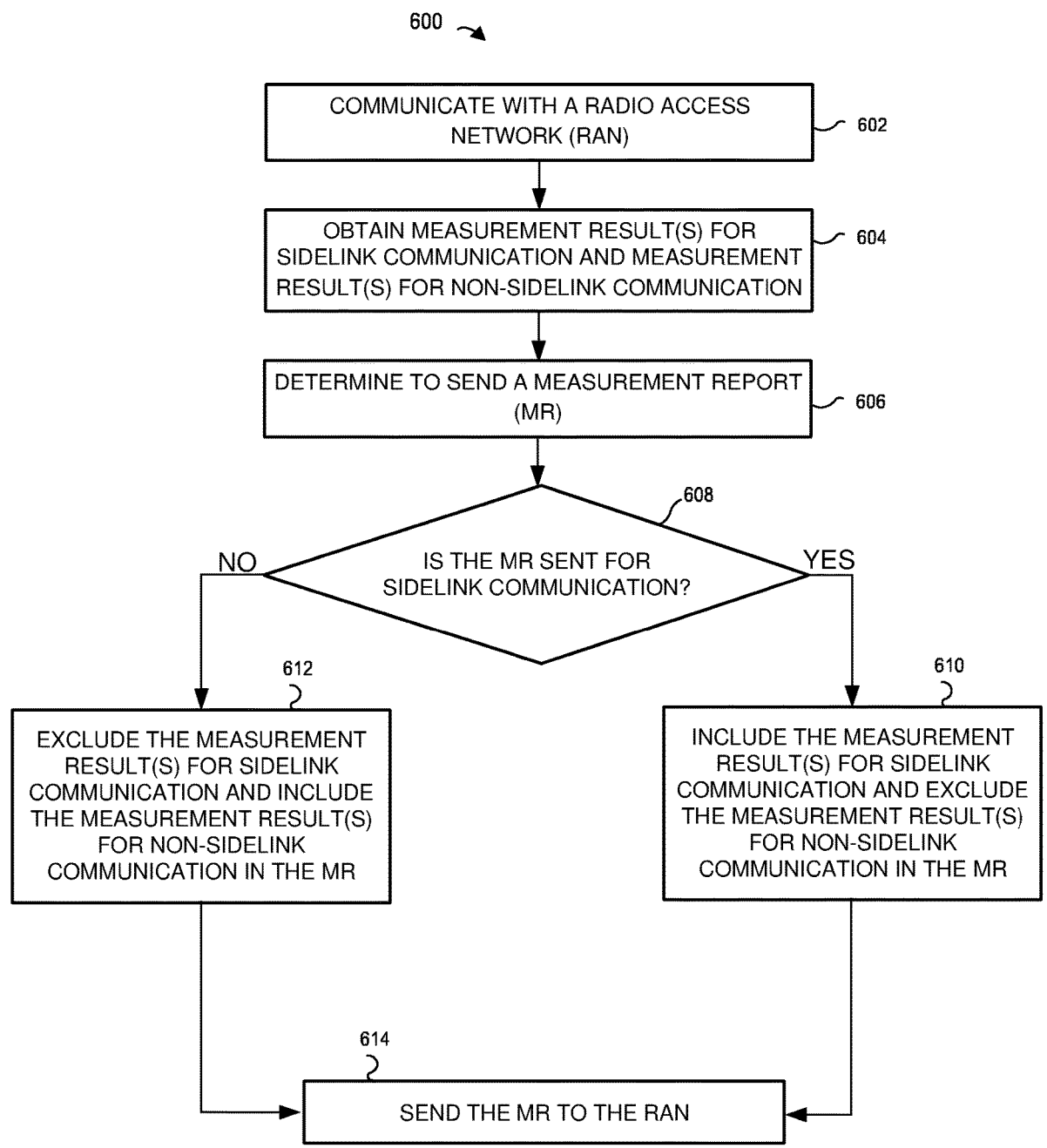
FIG. 6 is a flow diagram of yet another example method for obtaining and transmitting measurement results which include sidelink and non-sidelink information to a RAN, which can be implemented in the UE of this disclosure.

FIG. 6 is a flow diagram depicting a method 600 for transmitting a Measurement Report message, which may be implemented by a UE (e.g., the UE 102) of this disclosure. Initially, at block 602, the UE (e.g., in SC or DC) communicates with a radio access network (RAN) (e.g., RAN 105) (e.g., in events 302, 402A, 402B).

At block 604, the UE obtains measurement result(s) for sidelink communication and measurement result(s) for non-sidelink communication (e.g., in event 304). At block 606, the UE determines to send a Measurement Report message. At block 608, the UE determines whether the Measurement Report message is for sidelink communication.

If the Measurement Report message is for sidelink communication, the UE at block 610 includes the measurement result(s) for sidelink communication and excludes (i.e., refrains from including or does not include) the measurement result(s) for non-sidelink communication in the Measurement Report message (e.g., in events 306, 408A, 408B). If the Measurement Report message is not for sidelink communication, the UE at block 612 includes the measurement result(s) for non-sidelink communication and excludes (i.e., refrains from including or does not include) the measurement result(s) for sidelink communication in the Measurement Report message (e.g., in events 308, 412A, 411B). At block 614, the UE sends the Measurement Report message to the RAN (e.g., in events 306, 408A, 408B, 308, 412A, 411B).

Figure 7:
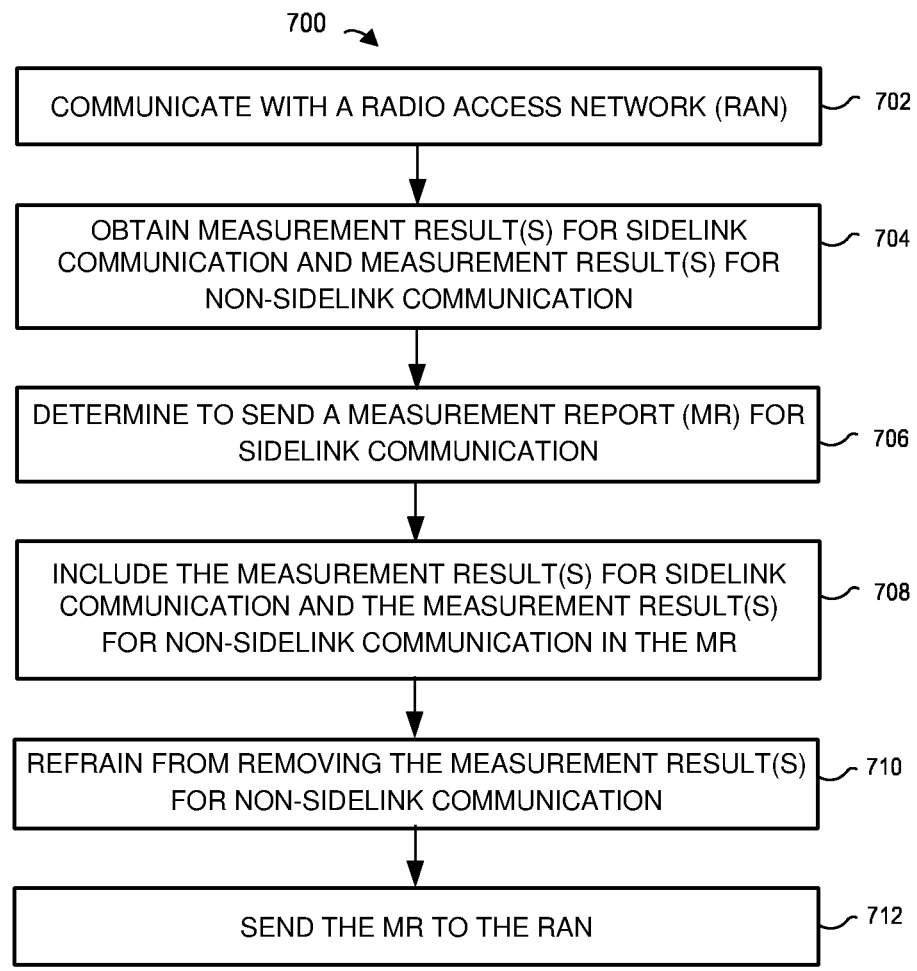
FIG. 7 is a flow diagram of another example method for obtaining and transmitting measurement results which include sidelink and non-sidelink information to a RAN, which can be implemented in the UE of this disclosure.

FIG. 7 is a flow diagram depicting a method 700 for transmitting a Measurement Report message, which may be implemented by a UE (e.g., the UE 102) of this disclosure. Initially, at block 702, the UE (e.g., in SC or DC) communicates with a radio access network (RAN) (e.g., RAN 105) (e.g., in events 302, 402A, 402B).

At block 704, the UE obtains measurement result(s) for sidelink communication and measurement result(s) for non-sidelink communication (e.g., in event 304). At block 706, the UE determines to send a Measurement Report message for sidelink communication. At block 708, the UE includes the measurement result(s) for sidelink communication and the measurement result(s) for non-sidelink communication in a first Measurement Report message in response to the determination (e.g., in events 306, 408A, 408B). At block 712, the UE refrains from removing the measurement result(s) for non-sidelink communication. At block 712, the UE sends the first Measurement Report message to the RAN (e.g., in events 306, 408A, 408B).

In some implementations, the UE transmits a second Measurement Report message including the measurement result(s) for non-sidelink communication to the RAN after transmitting the first Measurement Report message. In other implementations, the UE transmits a second Measurement Report message including measurement result(s) updated from the measurement result(s) for non-sidelink communication and new measurements made by the UE, after transmitting the first Measurement Report message.

In some implementations, the UE keeps evaluating measurement reporting trigger condition(s) based on the measurement result(s) for non-sidelink communication or measurement result(s) updated from the measurement result(s) for non-sidelink communication and new measurements made by the UE. If the UE detects the measurement reporting trigger condition(s) is/are met, the UE transmits the second Measurement Report message to the RAN as described above.

Figure 8:
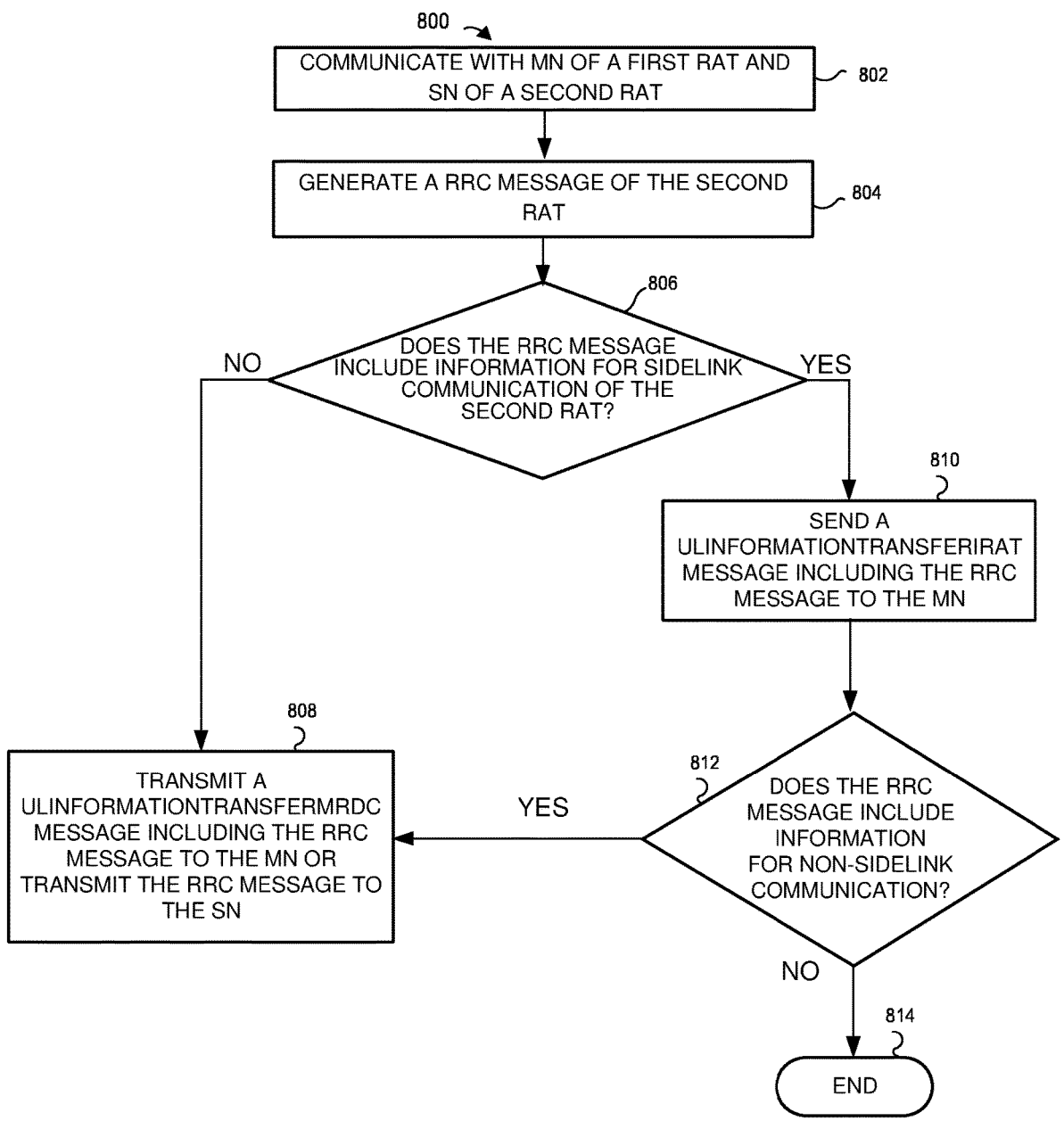
FIG. 8 is a flow diagram of an example method for obtaining information for sidelink communication and information for non-sidelink communication and transmitting the sidelink information and the non-sidelink information to a RAN operating in MR-DC and including an MN and an SN, which can be implemented in the UE of this disclosure.

FIG. 8 is a flow diagram depicting a method 800 for transmitting an RRC message in DC, which may be implemented by a UE (e.g., the UE 102) of this disclosure. Initially, at block 802, the UE (e.g., in SC or DC) communicates with MN (e.g., MN 104) of a first RAT and SN (e.g., SN 106) of a second RAT (e.g., in events 402A, 402B).

At block 804, the UE generates an RRC message of the second RAT (e.g., in events 404A, 404B). At block 806, the UE determines whether the RRC message includes information for sidelink communication of the second RAT. If the RRC message does not include information for sidelink communication of the second RAT, the UE at block 808 transmits a ULInformationTransferMRDC message including the RRC message to the MN (e.g., in event 412A) or transmits the RRC message to the SN (e.g., in event 411B).

If the RRC message includes information for sidelink communication of the second RAT, the UE at block 810 transmits a ULInformationTransferIRAT message including the RRC message to the MN (e.g., in events 408A, 408B). The UE 102 at block 812 determines whether the RRC message includes information for non-sidelink communication. If the RRC message includes information for non-sidelink communication of the second RAT, the UE at block 808 transmits a ULInformationTransferMRDC message including the RRC message to the MN (e.g., in events 412A, 411B). If the RRC message includes information for non-sidelink communication of the second RAT, the UE at block 814 takes no further action.

Figure 9:
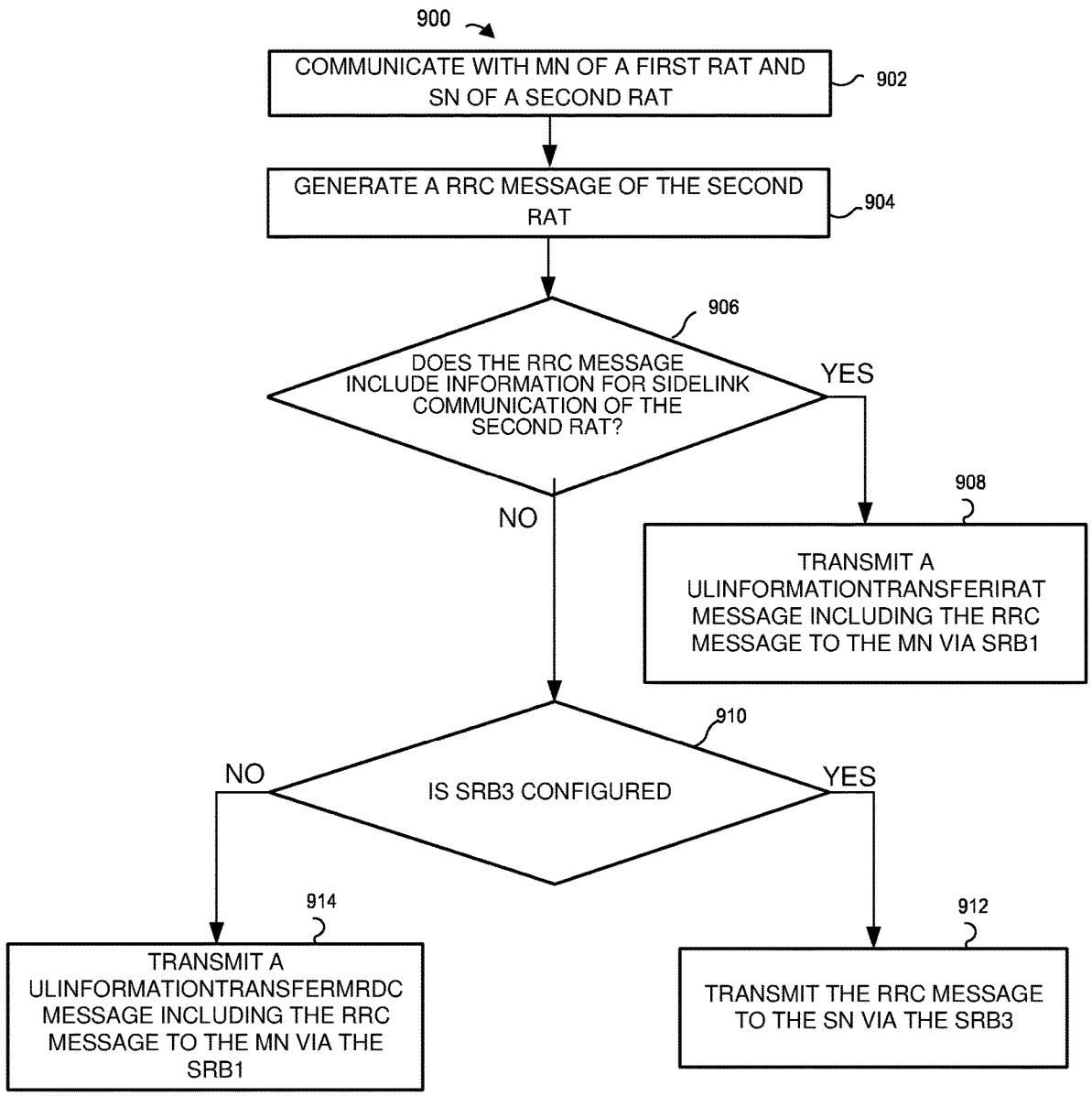
FIG. 9 is a flow diagram of another example method for obtaining information for sidelink communication and information for non-sidelink communication and transmitting the sidelink information and the non-sidelink information to a RAN operating in MR-DC and including an MN and an SN, which can be implemented in the UE of this disclosure.

FIG. 9 is a flow diagram depicting a method 900 for transmitting an RRC message in DC, which may be implemented by a UE (e.g., the UE 102) of this disclosure. Initially, at block 902, the UE (e.g., in SC or DC) communicates with MN (e.g., MN 104) of a first RAT and SN (e.g., SN 106) of a second RAT (e.g., in events 402A, 402B).

At block 904, the UE generates an RRC message of the second RAT (e.g., in events 404A, 404B). At block 906, the UE determines whether the RRC message includes information for sidelink communication of the second RAT. If the RRC message includes information for sidelink communication of the second RAT, the UE at block 908 transmits a ULInformationTransferIRAT message including the RRC message to the MN via SRB1 (e.g., in events 408A, 408B).

If the RRC message does not include information for sidelink communication of the second RAT, the UE at block 910 determines whether SRB3 is configured. If the SRB3 is configured, the UE at block 912 transmits the RRC message to the SN via the SRB3 (e.g., in event 411B). If the SRB3 is not configured, the UE at block 914 transmits a ULInformationTransferMRDC message including the RRC message to the MN via the SRB1 (e.g., in event 412A).

As shown with respect to FIGS. 8 and 9 in conjunction with FIGS. 4A and 4B, a UE can use different container messages (e.g., ULInformationTransferIRAT message and ULInformationTransferMRDC message) to indicate whether the contained RRC message includes information for sidelink communication or not.

Figure 10A:
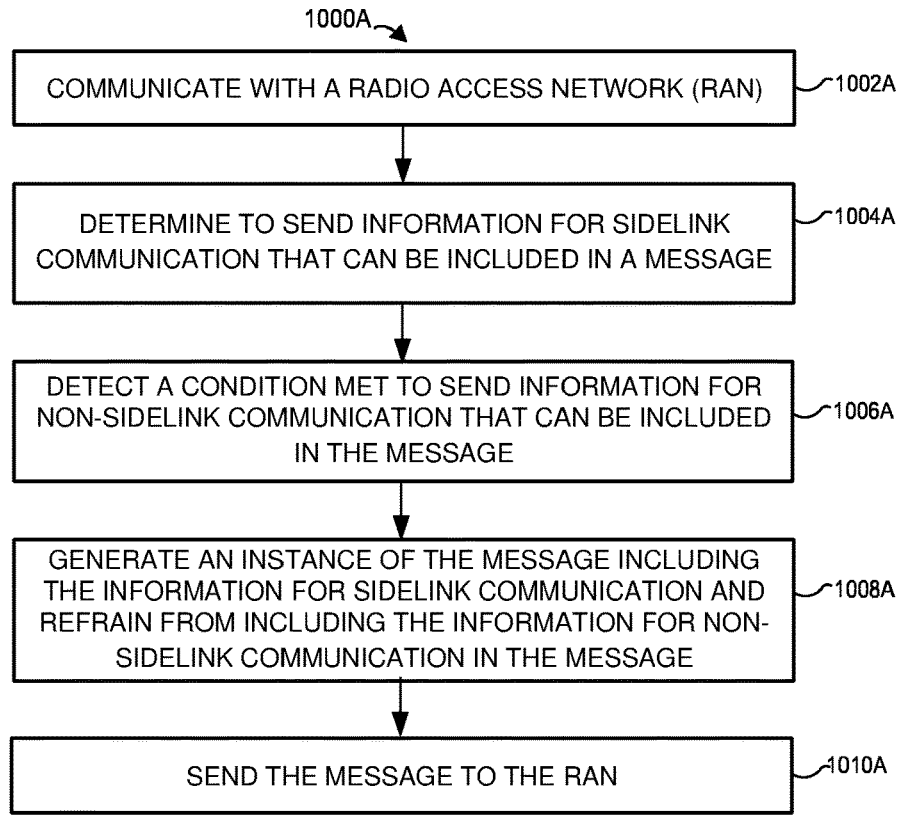
FIG. 10A is a flow diagram of an example method for obtaining and transmitting information for sidelink communication and information for non-sidelink communication to a RAN, which can be implemented in the UE of this disclosure.

FIG. 10A is a flow diagram depicting a method 1000A for transmitting a message including information for sidelink communication, which may be implemented by a UE (e.g., the UE 102) of this disclosure. Initially, at block 1002A, the UE (e.g., in SC or DC) communicates with a radio access network (RAN) (e.g., RAN 105) (e.g., in events 302, 402A, 402B).

At block 1004A, the UE determines to send information for sidelink communication which can be included in a message (e.g., in event 404A). The information for sidelink communication may be measurement results or assistance information. The UE may determine to send the information for sidelink communication based on a trigger condition for sidelink communication. If the UE detects that the trigger condition for sidelink communication is met, the UE determines to send information for sidelink communication. The trigger condition may be a threshold value for a measurement result for sidelink communication or any other suitable trigger condition.

At block 1006A, the UE detects a trigger condition is satisfied for sending information for non-sidelink communication. The trigger condition may be a threshold value for a measurement result for non-sidelink communication, such as a measurement result for DL/UL communication, or any other suitable trigger condition. Then at block 1008A, the UE generates an instance of a message, such as an RRC message, which includes the information for sidelink communication and excludes (i.e., refrains from including or does not include) the information for non-sidelink communication in the message in response to determining to send information for sidelink communication (e.g., in events 306, 408A, 408B). At block 1010A, the UE sends the message to the RAN (e.g., in events 306, 408A, 408B).

Figure 10B:
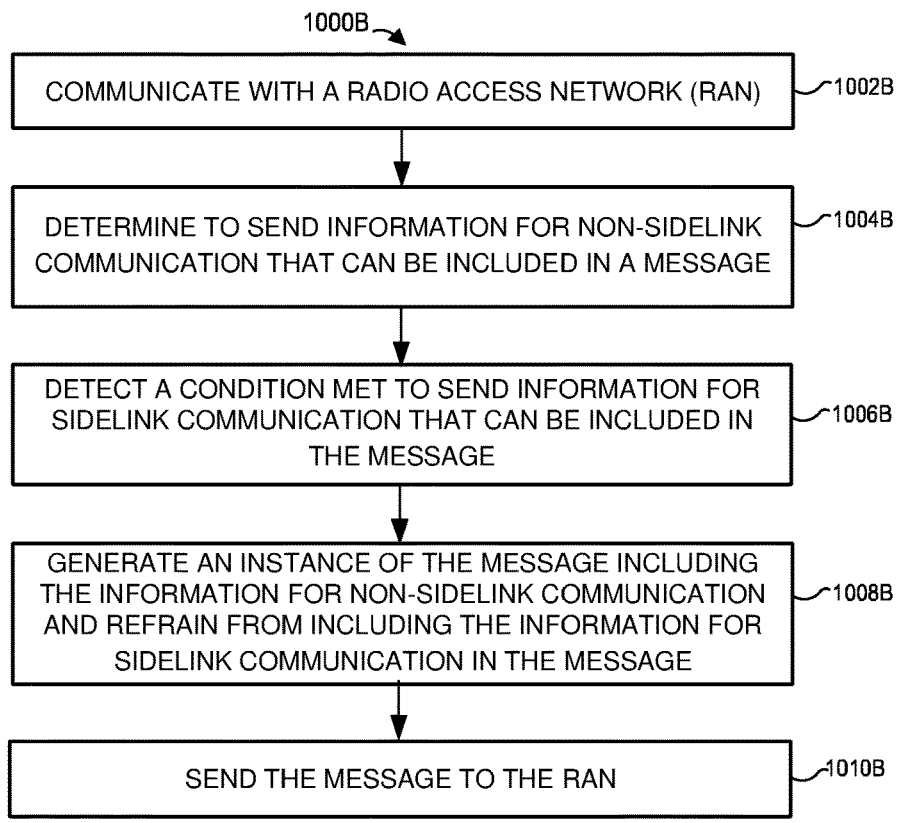
FIG. 10B is a flow diagram of another example method for obtaining and transmitting information for sidelink communication and information for non-sidelink communication to a RAN, which can be implemented in the UE of this disclosure.

FIG. 10B is a flow diagram depicting a method 1000B for transmitting a message including information for non-sidelink communication, which may be implemented by a UE (e.g., the UE 102) of this disclosure. Initially, at block 1002B, the UE (e.g., in SC or DC) communicates with a radio access network (RAN) (e.g., RAN 105) (e.g., in events 302, 402A, 402B).

At block 1004B, the UE determines to send information for non-sidelink communication which can be included in a message (e.g., in event 404A). The UE may determine to send the information for non-sidelink communication based on a trigger condition for non-sidelink communication. If the UE detects that the trigger condition for non-sidelink communication is met, the UE determines to send information for non-sidelink communication. The trigger condition may be a threshold value for a measurement result for non-sidelink communication, such as a measurement result for DL/UL communication, or any other suitable trigger condition.

At block 1006B, the UE detects a trigger condition is satisfied for sending information for sidelink communication. The trigger condition may be a threshold value for a measurement result for sidelink communication or any other suitable trigger condition. Then at block 1008B, the UE generates an instance of a message, such as an RRC message, which includes the information for non-sidelink communication and excludes (i.e., refrains from including or does not include) the information for sidelink communication in the message in response to determining to send information for non-sidelink communication (e.g., in events 308, 412A, 411B). At block 1010A, the UE sends the message to the RAN (e.g., in events 308, 412A, 411B).

The instance of the message which includes sidelink communication as described in the method 1000A may be a first instance of a message, and the instance of the message which includes non-sidelink communication as described in the method 1000B may be a second instance of a message. Both instances of the message can use the same message format (e.g., Measurement Report message format). The UE may send the first and second instances of the message as separate messages to the RAN.

Figure 11:
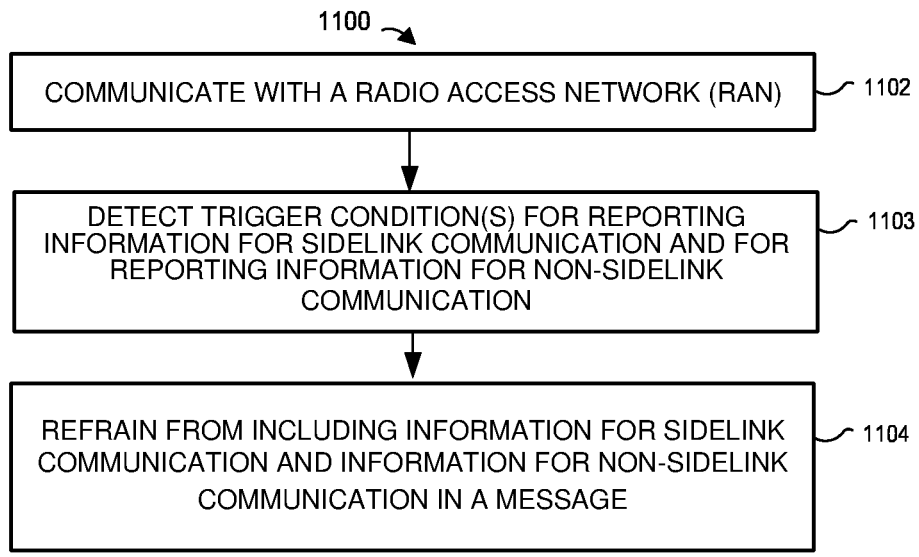
FIG. 11 is a flow diagram of yet another example method for obtaining and transmitting information for sidelink communication and information for non-sidelink communication to a RAN, which can be implemented in the UE of this disclosure.

FIG. 11 is a flow diagram depicting a method 1100 for transmitting a message including information for sidelink communication or non-sidelink communication, which may be implemented by a UE (e.g., the UE 102) of this disclosure. Initially, at block 1102, the UE (e.g., in SC or DC) communicates with a radio access network (RAN) (e.g., RAN 105) (e.g., in events 302, 402A, 402B).

Then at block 1103, the UE detects that a trigger condition is satisfied for sending information for sidelink communication and/or for sending information for non-sidelink communication. The information for sidelink communication and/or the information for non-sidelink communication may be measurement results or assistance information. The trigger condition may be a threshold value for a measurement result for sidelink communication or any other suitable trigger condition. Additionally, the trigger condition may be a threshold value for a measurement result for non-sidelink communication, such as a measurement result for DL/UL communication, or any other suitable trigger condition.

At block 1104, the UE refrains from including information for sidelink communication and information for non-sidelink communication in the same message. For example, if the UE detects a trigger condition is satisfied for sending information for sidelink communication, the UE generates an instance of a message, such as an RRC message, which includes the information for sidelink communication and excludes (i.e., refrains from including or does not include) the information for non-sidelink communication in the message (e.g., in events 306, 408A, 408B). If the UE detects a trigger condition is satisfied for sending information for non-sidelink communication, the UE generates an instance of a message, such as an RRC message, which includes the information for non-sidelink communication and excludes (i.e., refrains from including or does not include) the information for sidelink communication in the message (e.g., in events 308, 412A, 411B).

Figure 12:
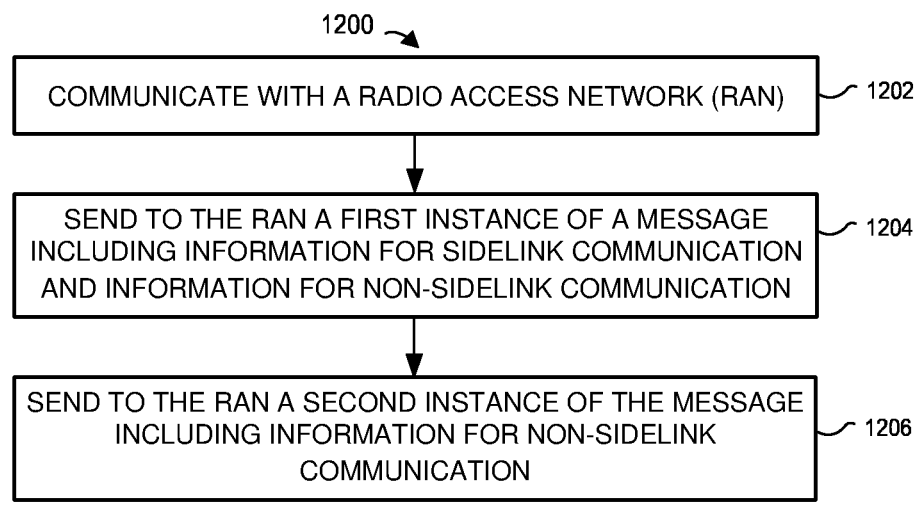
FIG. 12 is a flow diagram of another example method for obtaining and transmitting information for sidelink communication and information for non-sidelink communication to a RAN, which can be implemented in the UE of this disclosure.

FIG. 12 is a flow diagram depicting a method 1200 for transmitting a first instance of message including information for sidelink communication and a second instance of a message including information for non-sidelink communication, which may be implemented by a UE (e.g., the UE 102) of this disclosure. Initially, at block 1202, the UE (e.g., in SC or DC) communicates with a radio access network (RAN) (e.g., RAN 105) (e.g., in events 302, 402A, 402B).

The UE may obtain information for sidelink communication which may be measurement results or assistance information related to a sidelink communication between the UE and another UE. The UE may also obtain information for non-sidelink communication which may be measurement results or assistance information related to a DL/UL communication with the RAN. At block 1204, the UE generates and transmits to the RAN a first instance of a message, such as an RRC message, which includes information for sidelink communication and includes information for non-sidelink communication in the message (e.g., in events 306, 408A, 408B). At block 1206, the UE generates and transmits to the RAN a second instance of the message, such as an RRC message, which includes information for non-sidelink communication in the message (e.g., in events 308, 412A, 411B). Accordingly, the UE repeats the information for the non-sidelink communication in the second instance of the message.

Figure 13:
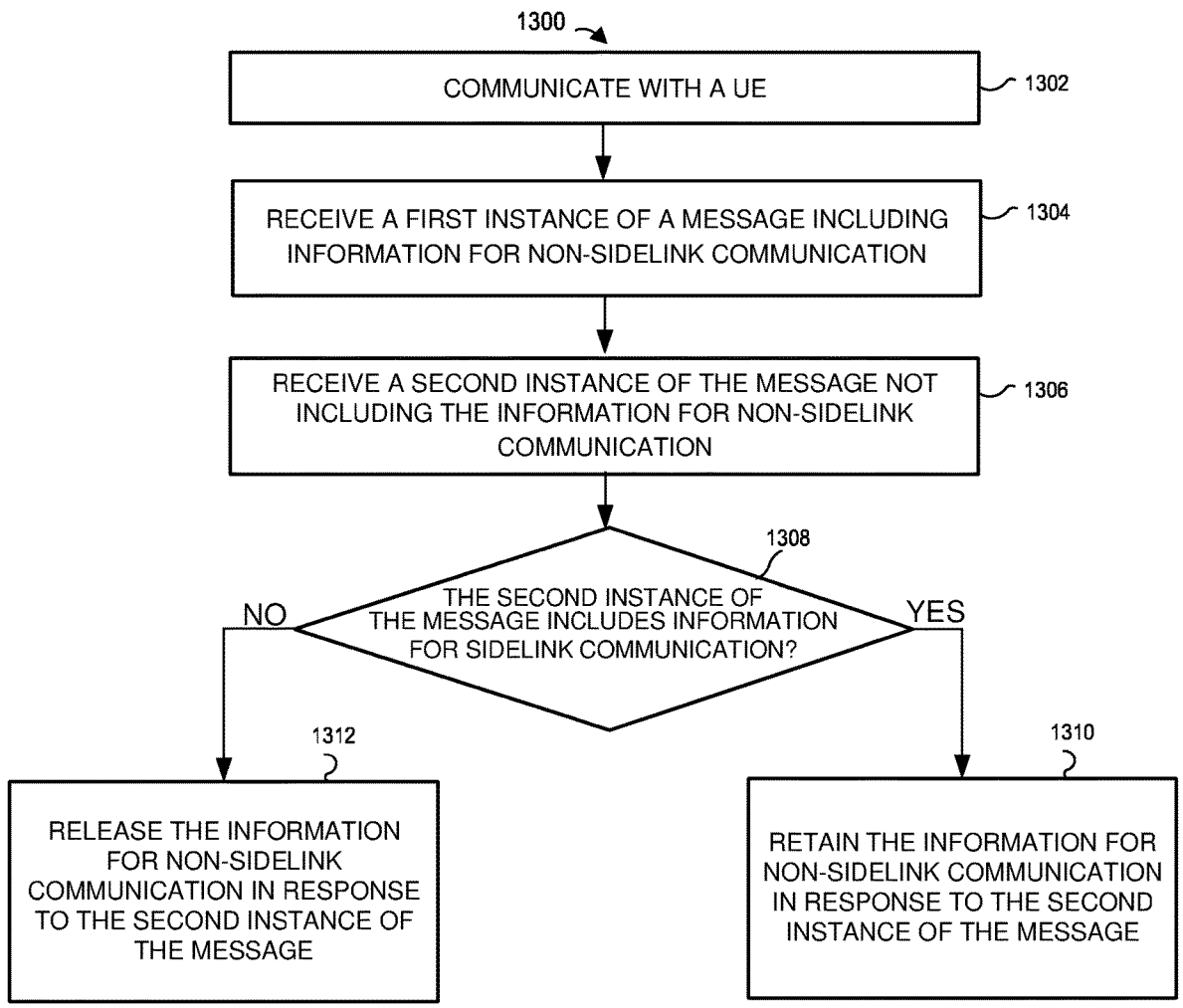
FIG. 13 is a flow diagram of an example method for receiving information for sidelink communication and information for non-sidelink communication from a UE, which can be implemented in the base station of this disclosure.

FIG. 13 is a flow diagram depicting an example method 1300 for receiving information for sidelink communication and information for non-sidelink communication from a UE, which may be implemented by a base station (e.g., the base station 104) of this disclosure. Initially, at block 1302, the base station (e.g., in SC or DC) communicates with a UE (e.g., UE 102) (e.g., in events 302, 402A, 402B).

At block 1304, the base station receives a first instance of a message, such as an RRC message, which is in a first message format and includes a payload having a first payload type. The first payload type may be a non-sidelink information payload type including information for non-sidelink communication (e.g., in events 308, 410A, 411B). At block 1306, the base station receives a second instance of the message, such as an RRC message, which is in the same message format as the first message format and includes a payload having a second payload type. The second payload type may be the same payload type as the first payload type (e.g., a non-sidelink information payload type including information for non-sidelink communication) or may be a different payload type from the first payload type (e.g., a sidelink information payload type including information for sidelink communication).

At block 1308, the base station determines whether the second instance of the message has the same payload type as the first instance of the message or a different payload type. If the payload types are different (e.g., the second instance of the message includes information for sidelink communication), the base station retains the first instance of the message in response to receiving the second instance of the message (block 1310).

On the other hand, if the payload types are the same (e.g., the second instance of the message does not include information for sidelink communication), the base station releases the first instance of the message in response to receiving the second instance of the message (block 1312).

The following list of examples reflects additional embodiments explicitly contemplated by the present disclosure

EXAMPLE 1

A method in a user device for managing sidelink and non-sidelink information, the method comprising: obtaining, by processing hardware in a user device communicating with a radio access network (RAN), a first set of information for sidelink communication with another user device; obtaining, by the processing hardware, a second set of information for non-sidelink communication; transmitting, by the processing hardware to the RAN, a first message including the first set of information; and transmitting, by the processing hardware to the RAN, a second message including the second set of information, the first and second messages being separate messages.

EXAMPLE 2

The method according to example 1, further comprising: excluding, by the processing hardware, the second set of information from the first message.

EXAMPLE 3

The method according to either one of example 1 or example 2, further comprising: excluding, by the processing hardware, the first set of information from the second message.

EXAMPLE 4

The method according to any of the preceding examples, wherein the first message further includes the second set of information.

EXAMPLE 5

The method according to any of the preceding examples, wherein the second message further includes the first set of information.

EXAMPLE 6

The method according to any of the preceding examples, wherein the first and second sets of information include measurement results or UE assistance information.

EXAMPLE 7

The method according to any of the preceding examples, wherein: transmitting the first message includes transmitting a first measurement report including a first set of measurement results for sidelink communication with the other user device; and transmitting the second message includes transmitting a second measurement report including a second set of measurement results for non-sidelink communication.

EXAMPLE 8

The method according to any of the preceding examples, further comprising: transmitting, by the processing hardware to the RAN, a radio resource control message to request or release sidelink resources or report quality of service information for the sidelink communication; and receiving, by the processing hardware from the RAN, a first measurement configuration configuring the user device to measure the first set of measurement results according to the first measurement configuration; and receiving, by the processing hardware from the RAN, a second measurement configuration configuring the user device to measure the second set of measurement results according to the second measurement configuration.

EXAMPLE 9

The method according to any of the preceding examples, wherein: the first set of measurement results includes at least one of: a sidelink carrier frequency, a sidelink Reference Signal Received Power (RSRP), a sidelink Reference Signal Received Quality (RSRQ), a sidelink Received Signal Strength Indicator (RSSI), a sidelink signal to noise and interference ratio (SINR), or sidelink channel busy ratio (CBR) values, and the second set of measurement results includes at least one of: a downlink or uplink carrier frequency, a downlink or uplink RSRP, a downlink or uplink RSRQ, a downlink or uplink RSSI, or a downlink or uplink SINR.

EXAMPLE 10

The method according to any of the preceding examples, further comprising: obtaining, by the processing hardware, a first trigger condition for transmitting the first measurement report including the first set of measurement results for sidelink communication with the other user device; obtaining, by the processing hardware, a second trigger condition for transmitting the second measurement report including the second set of measurement results for non-sidelink communication; transmitting, by the processing hardware to the RAN, the first measurement report in response to determining that the first trigger condition is satisfied; and transmitting, by the processing hardware to the RAN, the second measurement report in response to determining that the second trigger condition is satisfied.

EXAMPLE 11

The method according to any of the preceding examples, wherein: the RAN operates in multi-radio dual connectivity (MR-DC) and includes a master node (MN) and a secondary node (SN), transmitting the first message includes transmitting a first radio resource control message to the MN, the first radio resource control message including the first set of information; and transmitting the second message includes transmitting a second radio resource control message to the MN or the SN, the second radio resource control message including the second set of information.

EXAMPLE 12

The method according to any of the preceding examples, wherein the first radio resource control message is included in a first container message, and the second radio resource control message is included in a second container message different from the first container message.

EXAMPLE 13

The method according to any of the preceding examples, wherein: transmitting the first radio resource control message includes transmitting the first radio resource control message to the MN via a first signaling radio bearer (SRB); and transmitting the second radio resource control message includes transmitting the second radio resource control message to the SN via a second SRB.

EXAMPLE 14

The method according to any of the preceding examples, further comprising: determining, by the processing hardware, that the second SRB is configured; and transmitting, by the processing hardware to the SN, the second radio resource control message via the second SRB in response to determining that the second SRB is configured.

EXAMPLE 15

The method according to any of the preceding examples, further comprising: determining, by the processing hardware, that the second SRB is not configured; and transmitting, by the processing hardware to the MN, the second radio resource control message via the first SRB in response to determining that the second SRB is not configured.

EXAMPLE 16

The method according to any of the preceding examples, wherein: the first set of information includes configured grant assistance information; and the second set of information includes at least one of: information regarding enabling or disabling power saving, information regarding temporarily reduced capabilities or releasing the temporarily reduced capabilities, overheating assistance information, information indicating the overheating situation is gone, information regarding experiencing an in-device coexistence (IDC) problem or the IDC problem is gone, a preferred configuration, a preferred maximum aggregated bandwidth, a preferred maximum number of component carriers (CCs), a preferred maximum number of multiple-input and multiple-output (MIMO) layers, a preferred minimum scheduling offset, or a preferred radio resource control state.

EXAMPLE 17

A user device comprising processing hardware configured to implement a method according to any of the preceding examples.

EXAMPLE 18

A method in a base station for managing sidelink and non-sidelink information, the method comprising: receiving, by processing hardware in a base station communicating with a user device, a first instance of a message having a message format and a first payload having a first payload type; receiving, by the processing hardware, a second instance of the message having a same message format as the first instance of the message and a second payload having a second payload type; and in response to determining that the first payload and the second payload have a different payload type, retaining, by the processing hardware, the first instance of the message.

EXAMPLE 19

The method according to example 18, further comprising: in response to determining that the first payload and the second payload have a same payload type, releasing, by the processing hardware, the first instance of the message.

EXAMPLE 20

The method according to either one of example 18 or example 19, wherein the first payload and the second payload include measurement results or UE assistance information.

EXAMPLE 21

The method according to any of examples 18-20, wherein the first payload type is a non-sidelink information payload type including information for non-sidelink communication and the second payload type is a sidelink information payload type including information for sidelink communication between the user device and another user device.

EXAMPLE 22

The method according to any of examples 18-21, wherein the base station is a node in a radio access network (RAN) that operates in multi-radio dual connectivity (MR-DC), the base station being a master node (MN) in the RAN which includes a secondary node (SN), and further comprising: in response to receiving the first instance of the message having information for non-sidelink communication, transmitting, by the processing hardware to the SN, a transfer container message including the first instance of the message; and in response to receiving the second instance of the message having information for sidelink communication between the user device and another user device, transmitting, by the processing hardware to the SN, a modification request container message including the second instance of the message.

EXAMPLE 23

A method in a base station operating as a master node (MN) in a RAN which includes a secondary node (SN) in communication with a user device, the method comprising: in response to receiving a first container message containing information for non-sidelink communication, transmitting, by the processing hardware to the SN, a transfer container message including the information for non-sidelink communication; and in response to receiving a second container message containing information for sidelink communication between the user device and another user device, transmitting, by the processing hardware to the SN, a modification request container message including the information for sidelink communication.

EXAMPLE 24

The method according to example 23, wherein the information for non-sidelink communication comprises a UEAssistanceInformation message or a Measurement Report message related to downlink/uplink communication.

EXAMPLE 25

The method according to either one of example 23 or example 24, wherein the information for sidelink communication comprises a SidelinkUEInformationNR message, a SidelinkUEInformation message, or a Measurement Report message related to sidelink communication.

EXAMPLE 26

A base station comprising processing hardware configured to implement a method according to any of examples 18-25.

The following description may be applied to the description above.

In some implementations, "message" is used and can be replaced by "information element (IE)". In some implementations, "IE" is used and can be replaced by "field".

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for managing sidelink and non-sidelink information through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method for managing sidelink and non-sidelink information in a user device operating using multi-radio dual connectivity (MR-DC) with a radio access network (RAN) including a master node (MN) and a secondary node (SN), the method comprising:

obtaining, by the user device, a first set of information for sidelink communication with another user device;

obtaining, by the user device, a second set of information for non-sidelink communication;

transmitting, by the user device to the MN, a first container message including a first radio resource control message that includes the first set of information; and transmitting, by the user device to the MN or the SN, a second container message, different from the first container message, that includes a second radio resource control message including the second set of information.

2. The method of claim 1, further comprising:
excluding, by the user device, the second set of information from the first radio resource control message.

3. The method of claim 1, further comprising:
excluding, by the user device, the first set of information from the second radio resource control message.

4. The method of claim 1, wherein the first and second sets of information include measurement results.

5. The method of claim 1, further comprising:
transmitting, by the user device to the RAN, a third radio resource control message to request or release sidelink resources or report quality of service information for sidelink communication with the other user device; and
receiving, by the user device from the RAN, a first measurement configuration configuring the user device to measure the first set of measurement results according to the first measurement configuration; and
receiving, by the user device from the RAN, a second measurement configuration configuring the user device to measure the second set of measurement results according to the second measurement configuration.

6. The method of claim 1, wherein:
transmitting the first radio resource control message includes transmitting the first radio resource control message to the MN via a first signaling radio bearer (SRB); and
transmitting the second radio resource control message includes transmitting the second radio resource control message to the SN via a second SRB.

7. The method of claim 6, further comprising:
determining, by the user device, that the second SRB is configured; and
transmitting, by the user device to the SN, the second radio resource control message via the second SRB in response to determining that the second SRB is configured.

8. The method of claim 6, further comprising:
determining, by the user device, that the second SRB is not configured; and
transmitting, by the user device to the MN, the second radio resource control message via the first SRB in response to determining that the second SRB is not configured.

9. The method of claim 1, wherein:
the first set of information includes configured grant assistance information; and
the second set of information includes at least one of: information regarding enabling or disabling power saving, information regarding temporarily reduced capabilities or releasing the temporarily reduced capabilities, overheating assistance information, information indicating the overheating situation is gone, information regarding experiencing an in-device coexistence (IDC) problem or the IDC problem is gone, a preferred configuration, a preferred maximum aggregated bandwidth, a preferred maximum number of component carriers (CCs), a preferred maximum number of multiple-input and multiple-output (MIMO) layers, a preferred minimum scheduling offset, or a preferred radio resource control state.

10. The method of claim 1, wherein transmitting the second container message to the MN or the SN includes transmitting the second container message to the MN.

11. The method of claim 1, wherein transmitting the second container message to the MN or the SN includes transmitting the second container message to the SN.

12. The method of claim 1, wherein the first and second sets of information include UE assistance information.

13. The method of claim 1, wherein the user device operates using Evolved Universal Terrestrial Radio Access (EUTRA)-New Radio (NR) DC (EN-DC) with the MN and the SN.

14. A user device operating using multi-radio dual connectivity (MR-DC) with a radio access network (RAN) including a master node (MN) and a secondary node (SN), the user device comprising processing hardware configured to:
  obtain a first set of information for sidelink communication with another user device;
  obtain a second set of information for non-sidelink communication;
  transmit a first container message including a first radio resource control message to the MN including the first set of information; and
  transmit a second container message to the MN or the SN, different from the first container message, that includes a second radio resource control message including the second set of information.

15. The user device of claim 14, wherein the second container message is transmitted to the MN.

16. The user device of claim 14, wherein the second container message is transmitted to the SN.

17. The user device of claim 14, wherein the processing hardware is further configured to:
  exclude the second set of information from the first radio resource control message.

18. The user device of claim 14, wherein the first and second sets of information include measurement results or UE assistance information.

19. The user device of claim 14, wherein the processing hardware is further configured to:
  exclude the first set of information from the second radio resource control message.

* * * * *